United States Patent
Kihara et al.

(10) Patent No.: US 6,865,002 B2
(45) Date of Patent: Mar. 8, 2005

(54) IMAGE EXPOSURE-RECORDING DEVICE AND IMAGE EXPOSURE-RECORDING METHOD

(75) Inventors: Nobuhiro Kihara, Kanagawa (JP); Megumi Ezura, Tokyo (JP); Akira Shirakura, Tokyo (JP)

(73) Assignee: Sony Corporation, Tokyo (JP)

( * ) Notice: Subject to any disclaimer, the term of this patent is extended or adjusted under 35 U.S.C. 154(b) by 48 days.

(21) Appl. No.: 10/362,420
(22) PCT Filed: Jun. 19, 2002
(86) PCT No.: PCT/JP02/06119
§ 371 (c)(1),
(2), (4) Date: Feb. 25, 2003
(87) PCT Pub. No.: WO03/003129
PCT Pub. Date: Jan. 9, 2003

(65) Prior Publication Data
US 2003/0179424 A1 Sep. 25, 2003

(30) Foreign Application Priority Data
Jun. 27, 2001 (JP) .................................... 2001-195191

(51) Int. Cl.[7] ................................................ G03H 1/26
(52) U.S. Cl. ............................ 359/23; 359/35; 359/22; 359/30
(58) Field of Search ........................ 359/22, 23, 25, 359/26, 27, 30, 35

(56) References Cited

U.S. PATENT DOCUMENTS 5,892,597 A    4/1999  Iwata et al.
5,949,559 A  *  9/1999  Kihara et al. ................ 359/23

FOREIGN PATENT DOCUMENTS

| JP | 54-160257 A1 | 12/1979 |
| JP | 58-72982 A1  | 5/1983 |
| JP | 2-109086 A1  | 4/1990 |
| JP | 5-72959 A1   | 3/1993 |

OTHER PUBLICATIONS

International Search Report for PCT/JP02/06119 dated Aug. 20, 2002.

* cited by examiner

Primary Examiner—Fayez Assaf
(74) Attorney, Agent, or Firm—Rader Fishman & Grauer

(57) ABSTRACT

An image exposure recorder for exposure-recording a holographic stereogram image or a hologram image on a recording medium for hologram. The recorder has an inverse correction system for rotating the polarization plane of a reference light (R) by means of a half-wave plate (11), directing the reference light (R) to a hologram recording medium (3), and measuring the intensity of a part of the reference light (R) transmitted through a polarizer (12) out of the reference light (R) transmitted through a part of the area of the hologram recording medium by means of a photodetector (13). In the inverse correction system, the angle of rotation of the half-wave plate is so determined that the intensity of the reference light (R) determined by the photodetector may be minimum or maximum. Therefore the degradation of the coherence between the object light and the reference light attributed to the transmission of the object and reference lights through the hologram recording medium having birefringence is prevented, and thus a holographic stereogram for reproducing a bright holographic stereogram image is fabricated.

42 Claims, 15 Drawing Sheets

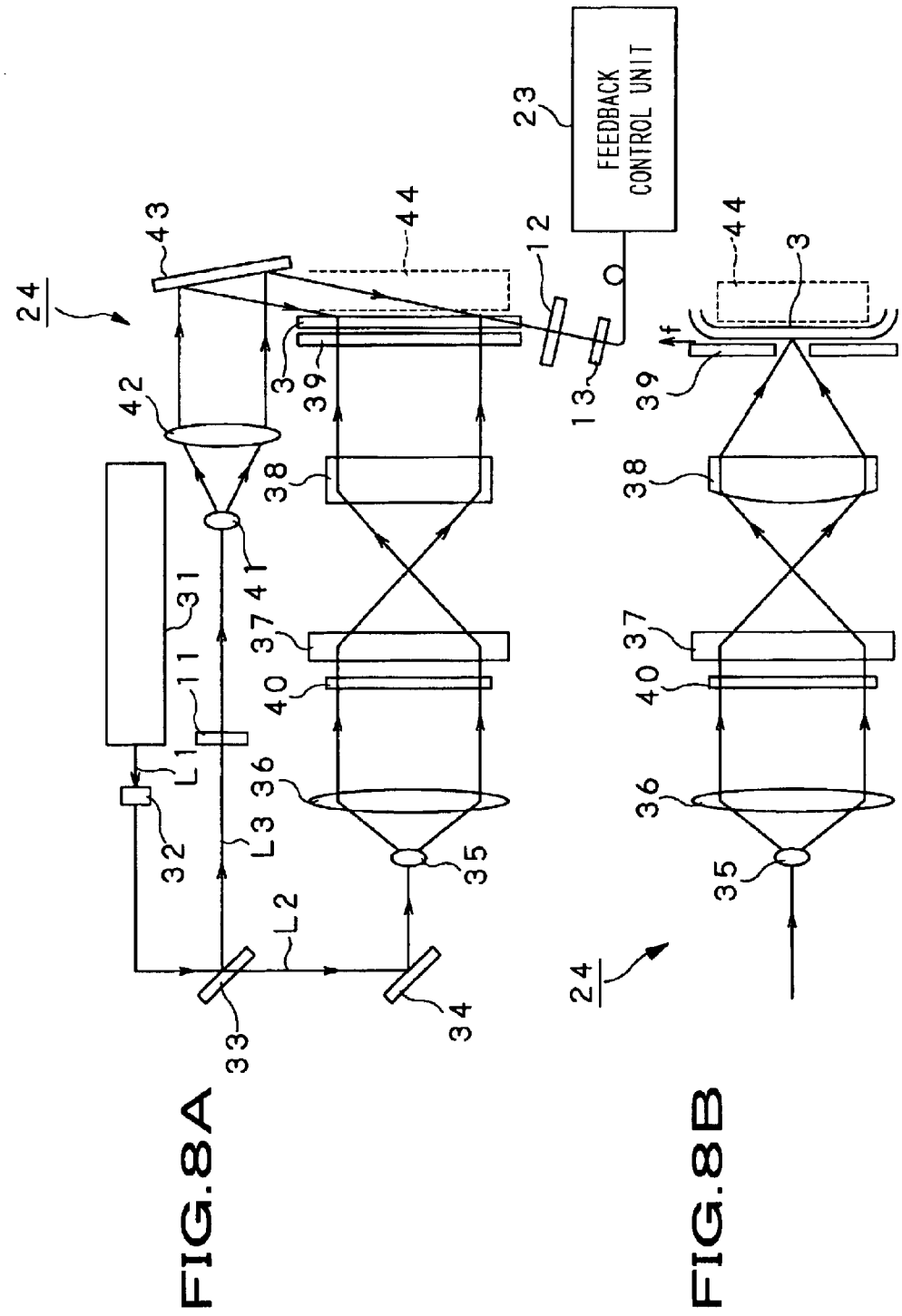

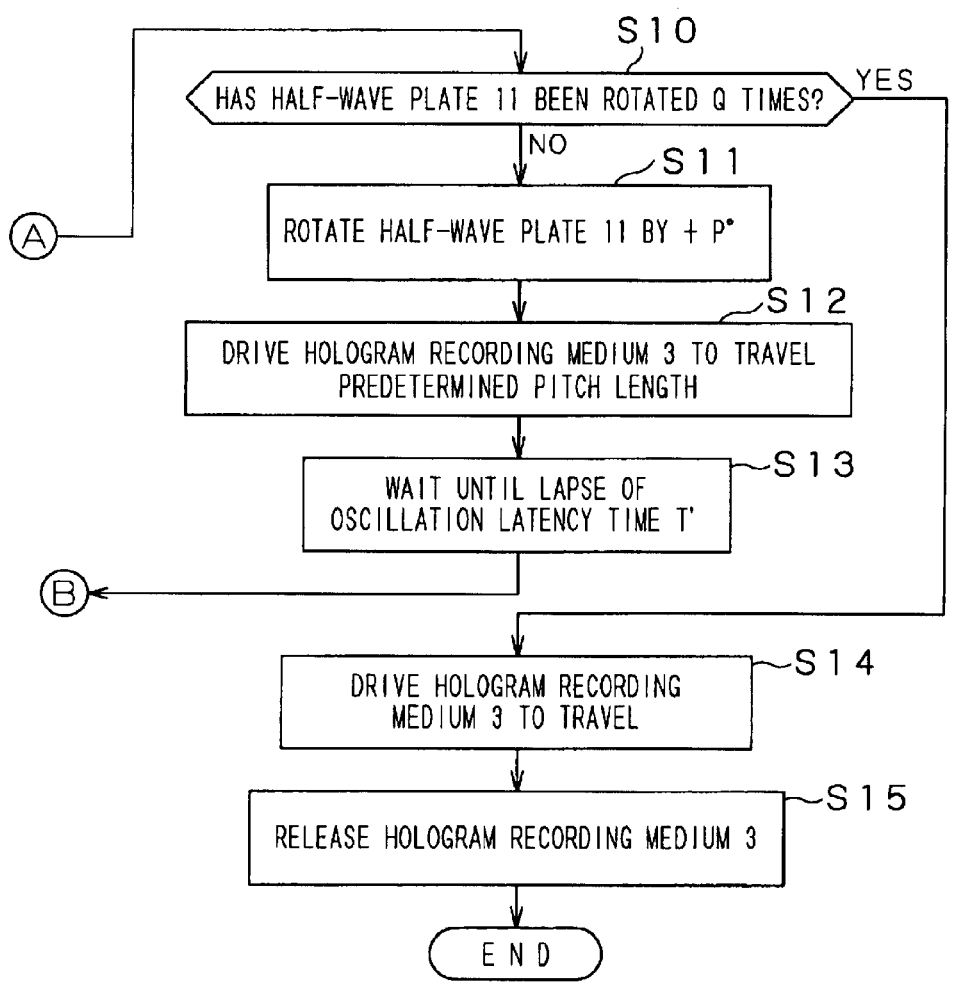

IMAGE EXPOSURE-RECORDING DEVICE AND IMAGE EXPOSURE-RECORDING METHOD

TECHNICAL FIELD

This invention relates to an image exposure-recording device and an image exposure-recording method for exposure-recording holographic stereogram images or hologram images to a hologram recording medium.

BACKGROUND ART

A holographic stereogram is produced by, for example, using multiple images of a subject sequentially picked up from different observation points as original images and sequentially exposure-recording these original images to a single hologram recording medium as strip-like or dot-like element holograms.

For example, a holographic stereogram having parallax information only in the lateral direction is produced by sequentially displaying a plurality of original images 101a to 101e of a subject 100 sequentially picked up from different observation points in the lateral direction, on a display unit in a holographic stereogram producing device having a predetermined optical system, and then sequentially exposure-recording interference fringes generated by interference between object light modulated by casting a laser beam on the displayed images and reference light, as strip-like element holograms to a hologram recording medium 102, as shown in FIG. 17.

In the holographic stereogram thus produced, image information obtained by sequential image pickup from different observation points in the lateral direction is sequentially recorded in the lateral direction as strip-like element holograms. Therefore, if an observer at a certain position sees this holographic stereogram with one eye, an aggregate of image information recorded as a part of the element holograms is identified as a two-dimensional image. If the observer sees this holographic stereogram with one eye at a different position, an aggregate of image information recorded as another part of the element holograms is identified as another two-dimensional image. Therefore, if the observer sees the holographic stereogram with both eyes, the exposure-recorded image is identified as a three-dimensional image because of the parallax between the right and left eyes.

An application of such a holographic stereogram is, for example, a printer system made up of a combination of a shooting device which picks up images of a subject and generates a parallax image string and a printer device which outputs a holographic stereogram or a hologram as a printed matter as in the above-described holographic stereogram producing device, as described in Akira Shirakura, Nobuhiro Kihara and Shigeyuki Baba, "Instant holographic portrait printing system," Proceeding of SPIE, Vol.3292, pp.246–253, January 1998, and Kihara, Shirakura and Baba, "High-speed hologram portrait printing system," Three-Dimensional Image Conference 1998, July 1998, and so on. Such a printer system can provide services from shooting of a subject to printing of the result of shooting, in the same place.

In producing the above-described holographic stereogram, a so-called film-coated recording medium formed by holding a photopolymer layer 202 made of photopolymerization-type photopolymer between a base film 201 and a cover film 203 is used as a hologram recording medium 200, as shown in FIG. 18. The hologram recording medium 200 having such a multilayered film shape enables direct exposure-recording on the photopolymer layer 202 without having to replace it by glass or the like in producing the holographic stereogram. Therefore, it is very easy to handle.

As the base film 201 and the cover film 203 of such a hologram recording medium 200, polyethylene terephthalate (hereinafter referred to as PET) films are mainly used. This is because of various requirements in the process of manufacturing the hologram recording medium 200. Specifically, in the hologram recording medium 200, the chemical resistance of the base film 201 and the cover film 203 is required in the process of applying the photopolymer layer 202. Moreover, it is required that the photopolymer layer 202, and pigments, sensitizer and the like contained in the photopolymer layer 202 should not react or diffuse. Therefore, in the hologram recording medium 200, PET films are used as films that meet these requirements. The present applicant have verified this by comparative experiments with hologram recording media having base films and cover films of other materials.

It is known that the exposure-recorded holographic stereogram images of the holographic stereogram have uneven brightness depending on a hologram recording medium to be used. As a cause of this, the coherence of a laser beam cast on the hologram recording medium 200 in producing the holographic stereogram is considered. As an element affecting this coherence, double refraction caused by the base film 201 and the cover film 203 of the hologram recording medium 200 is considered. That is, the above-described PET film has double refraction and this double refraction of the PET film is considered to adversely affect the coherence of the laser beam.

FIG. 19 shows the concept of double refraction due to the PET film. For example, incident light I in a linearly polarized state with its direction of light wave oscillation indicated by an arrow aa in FIG. 19 is affected by double refraction when passing through a PET film PF. Therefore, exit light E passed through the PET film PF is typically in an elliptically polarized state with its direction of light wave oscillation indicated by an arrow bb in FIG. 19. Since the elliptically polarized state of the exit light E varies depending on the thickness, the manufacturing method and the direction of cutting of the PET film PF, it is difficult to uniformly manufacture the PET film PF with high precision. Moreover, the elliptically polarized state of the exit light E also varies depending on the polarization angle of the linearly polarized incident light I.

The brightness of the holographic stereogram images is decided by the material characteristics such as the percentage modulation of refractive index and the thickness of the hologram recording medium 200 and also depends on oscillations from outside at the time of exposure-recording and the coherence of a laser beam cast on the hologram recording medium 200 as described above. The coherence of the laser beam is affected by the polarization states of object light and reference light as well as the coherence distance of a laser light source to be used. As for the polarization states of object light and reference light, it is ideal that both object light O and reference light R cast on the hologram recording medium 200 are linearly polarized light having the same direction of light wave oscillation indicated by arrows cc and dd as shown in FIG. 20. Particularly, it is confirmed that the highest coherence is obtained when the reference light R is S-polarized light. It should be noted that the object light O and the reference light R have to be linearly polarized light in the layer where the holographic stereogram is actually recorded, that is, the photopolymer layer 202 of the hologram recording medium 200.

However, in the hologram recording medium 200 having the multilayer structure shown in FIG. 18, even if both object light and reference light incident on the hologram recording medium 200 are linearly S-polarized light, the object light and the reference light will not be linearly S-polarized light when reaching the photopolymer layer 202 because of double refraction due to the base film 201 and the cover film 203, which are made of PET films.

Thus, in the holographic stereogram, changes from the initial polarization states of the object light and the reference light due to double refraction due to the base film 201 and the cover film 203 adversely affect the coherence. As a result, the exposure-recorded holographic stereogram images are darkened.

DISCLOSURE OF THE INVENTION

In view of the foregoing status of the art, it is an object of the present invention to provide an image exposure-recording device and an image exposure-recording method which enable provision of optimum coherence for producing a holographic stereogram or a hologram by avoiding reduction in coherence between object light and reference light due to transmission of the object light and the reference light through a hologram recording medium having double refraction and thus enable elimination of instability in brightness of holographic stereogram images or hologram images.

In order to achieve the above-described object, an image exposure-recording device according to the present invention is adapted for exposure-recording holographic stereogram images or hologram images to a hologram recording medium. The device comprises: exposure-recording means for casting a laser beam as object light and reference light on the hologram recording medium and thus exposure-recording the holographic stereogram images or the hologram images; polarization state detection means for detecting the polarization state of the laser beam transmitted through the hologram recording medium; and polarization state varying means for changing the polarization state of the laser beam caused to be incident on the hologram recording medium on the basis of the result of the detection by the polarization state detection means so that the highest coherence between the object light and the reference light is obtained on a recording layer in the hologram recording medium.

In the image exposure-recording device according to the present invention, when the exposure-recording means exposure-records holographic stereogram images or the hologram images, the polarization state detection means detects the polarization state of the laser beam transmitted through the hologram recording medium, and on the basis of the result of the detection by the polarization state detection means, the polarization state varying means changes the polarization state of the laser beam and thus increases the coherence between the object light and the reference light on the recording layer in the hologram recording medium. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

An image exposure-recording method according to the present invention is adapted for exposure-recording holographic stereogram images or hologram images to a hologram recording medium. The method comprises: a polarization state detection step of, when casting a laser beam as object light and reference light on the hologram recording medium and thus exposure-recording the holographic stereogram images or the hologram images, detecting the polarization state of the laser beam transmitted through the hologram recording medium; and a polarization state varying step of changing the polarization state of the laser beam caused to be incident on the hologram recording medium on the basis of the result of the detection at the polarization state detection step so that the highest coherence between the object light and the reference light is obtained on a recording layer in the hologram recording medium.

In the image exposure-recording method according to the present invention, when the exposure-recording holographic stereogram images or the hologram images, the polarization state of the laser beam transmitted through the hologram recording medium is detected, and on the basis of the result of the detection, the polarization state of the laser beam is changed and the coherence between the object light and the reference light on the recording layer in the hologram recording medium is increased. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Another image exposure-recording device according to the present invention is adapted for exposure-recording holographic stereogram images or hologram images to a hologram recording medium. The device comprises: exposure-recording means for casting a laser beam as object light and reference light on the hologram recording medium and thus exposure-recording the holographic stereogram images or the hologram images; polarization state detection means for detecting the polarization state of the laser beam transmitted through the hologram recording medium; and recording medium rotation means for rotating the hologram recording medium on the basis of the result of the detection by the polarization state detection means so that the highest coherence between the object light and the reference light is obtained on a recording layer in the hologram recording medium.

In the image exposure-recording device according to the present invention, when the exposure-recording means exposure-records holographic stereogram images or the hologram images, the polarization state detection means detects the polarization state of the laser beam transmitted through the hologram recording medium, and on the basis of the result of the detection by the polarization state detection means, the recording medium rotation means rotates the hologram recording medium and thus increases the coherence between the object light and the reference light on the recording layer in the hologram recording medium. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Another image exposure-recording method according to the present invention is adapted for exposure-recording holographic stereogram images or hologram images to a hologram recording medium. The method comprises: a polarization state detection step of, when casting a laser beam as object light and reference light on the hologram recording medium and thus exposure-recording the holographic stereogram images or the hologram images, detecting the polarization state of the laser beam transmitted through the hologram recording medium; and a recording medium rotation step of rotating the hologram recording medium on the basis of the result of the detection at the polarization state detection step so that the highest coherence between the object light and the reference light is obtained on a recording layer in the hologram recording medium.

In the image exposure-recording method according to the present invention, when the exposure-recording holographic stereogram images or the hologram images, the polarization state of the laser beam transmitted through the hologram recording medium is detected, and on the basis of the result of the detection, the hologram recording medium is rotated and the coherence between the object light and the reference light on the recording layer in the hologram recording medium is increased. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Another image exposure-recording device according to the present invention is adapted for exposure-recording holographic stereogram images or hologram images to a hologram recording medium. The device comprises: exposure-recording means for casting a laser beam as object light and reference light on the hologram recording medium and thus exposure-recording the holographic stereogram images or the hologram images; and polarization state varying means for changing the polarization state of the laser beam caused to be incident on the hologram recording medium. The exposure-recording means exposure-records a plurality of conditioning holographic stereogram images or hologram images for each change in polarization state by the polarization state varying means, as conditioning exposure-recording for deciding a polarization state of the laser beam such that the highest coherence between the object light and the reference light is obtained on a recording layer in the hologram recording medium, for each exposure-recording of at least one or more holographic stereogram images or hologram images. The polarization state varying means changes the polarization state of the laser beam so as to obtain the polarization state of the laser beam such that the highest coherence between the object light and the reference light is obtained, detected on the basis of the plurality of conditioning holographic stereogram images or hologram images.

In the image exposure-recording device according to the present invention, as conditioning exposure-recording for deciding a polarization state of the laser beam such that the highest coherence between the object light and the reference light is obtained on the recording layer in the hologram recording medium, the exposure-recording means exposure-records a plurality of conditioning holographic stereogram images or hologram images for each change in polarization state, and the polarization state varying means changes the polarization state of the laser beam so as to obtain the polarization state of the laser beam such that the highest coherence between the object light and the reference light is obtained, detected on the basis of the plurality of conditioning holographic stereogram images or hologram images.

Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Another image exposure-recording method according to the present invention is adapted for exposure-recording holographic stereogram images or hologram images to a hologram recording medium. The method comprises: a conditioning exposure-recording step of casting a laser beam as object light and reference light on the hologram recording medium for each exposure-recording of at least one or more holographic stereogram images or hologram images and thus exposure-recording a plurality of conditioning holographic stereogram images or hologram images for each change in polarization state in order to decide a polarization state of the laser beam such that the highest coherence between the object light and the reference light is obtained on a recording layer in the hologram recording medium; and a polarization state varying step of changing the polarization state of the laser beam so as to obtain the polarization state of the laser beam such that the highest coherence between the object light and the reference light is obtained, detected on the basis of the plurality of conditioning holographic stereogram images or hologram images.

In the image exposure-recording method according to the present invention, as conditioning exposure-recording for deciding a polarization state of the laser beam such that the highest coherence between the object light and the reference light is obtained on the recording layer in the hologram recording medium, a plurality of conditioning holographic stereogram images or hologram images for each change in polarization state are exposure-recorded, and the polarization state of the laser beam is changed so as to obtain the polarization state of the laser beam such that the highest coherence between the object light and the reference light is, detected on the basis of the plurality of conditioning holographic stereogram images or hologram images. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Moreover, another image exposure-recording device according to the present invention is adapted for exposure-recording holographic stereogram images or hologram images to a hologram recording medium. The device comprises: exposure-recording means for casting a laser beam as object light and reference light on the hologram recording medium and thus exposure-recording the holographic stereogram images or the hologram images; and recording medium rotation means for rotating the hologram recording medium. The exposure-recording means exposure-records a plurality of conditioning holographic stereogram images or hologram images for each rotation of the hologram recording medium by the recording medium rotation means, as conditioning exposure-recording for deciding a polarization state of the laser beam such that the highest coherence between the object light and the reference light is obtained on a recording layer in the hologram recording medium, for each exposure-recording of at least one or more holographic stereogram images or hologram images. The recording medium rotation means rotates the hologram recording medium so as to obtain the polarization state of the laser beam such that the highest coherence between the object light and the reference light is obtained, detected on the basis of the plurality of conditioning holographic stereogram images or hologram images.

In the image exposure-recording device according to the present invention, as conditioning exposure-recording for deciding a polarization state of the laser beam such that the highest coherence between the object light and the reference light is obtained on the recording layer in the hologram recording medium, the exposure-recording means exposure-records a plurality of conditioning holographic stereogram images or hologram images for each rotation of the hologram recording medium, and the recording medium rotation means rotates the hologram recording medium so as to obtain the polarization state of the laser beam such that the highest coherence between the object light and the reference light is obtained, detected on the basis of the plurality of conditioning holographic stereogram images or hologram images. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

Another image exposure-recording method according to the present invention is adapted for exposure-recording holographic stereogram images or hologram images to a hologram recording medium. The method comprises: a conditioning exposure-recording step of casting a laser beam as object light and reference light on the hologram recording medium for each exposure-recording of at least one or more holographic stereogram images or hologram images and thus exposure-recording a plurality of conditioning holographic stereogram images or hologram images for each rotation of the hologram recording medium in order to decide a polarization state of the laser beam such that the highest coherence between the object light and the reference light is obtained on a recording layer in the hologram recording medium; and a recording medium rotation step of rotating the hologram recording medium so as to obtain the polarization state of the laser beam such that the highest coherence between the object light and the reference light is obtained, detected on the basis of the plurality of conditioning holographic stereogram images or hologram images.

In the image exposure-recording method according to the present invention, as conditioning exposure-recording for deciding a polarization state of the laser beam such that the highest coherence between the object light and the reference light is obtained on the recording layer in the hologram recording medium, a plurality of conditioning holographic stereogram images or hologram images for each rotation of the hologram recording medium are exposure-recorded, and the hologram recording medium is rotated so as to obtain the polarization state of the laser beam such that the highest coherence between the object light and the reference light is obtained, detected on the basis of the plurality of conditioning holographic stereogram images or hologram images. Therefore, reduction in coherence between the object light and the reference light due to transmission of the object light and the reference light through the hologram recording medium having double refraction is avoided, and a holographic stereogram or a hologram based on reproduction of bright holographic stereogram images or hologram images can be produced.

The other objects of the present invention and specific advantages provided by the present invention will be further clarified by the following description of embodiments with reference to the drawings.

BRIEF DESCRIPTION OF THE DRAWINGS

FIG. 2A shows an initial state. FIG. 2B shows an exposure state. FIG. 2C shows a fixing state.

FIG. 5A shows the plane of polarization of the reference light incident on the hologram recording medium. FIG. 5B shows the plane of polarization of the reference light on a photopolymer layer in the hologram recording medium. FIG. 5C shows the plane of polarization of the object light on the photopolymer layer.

FIGS. 8A and 8B are views for explaining an optical system of the holographic stereogram producing device to which the present invention is applied. FIG. 8A is a front view of the optical system of the holographic stereogram producing device. FIG. 8B is a plan view of the optical system of the holographic stereogram producing device.

FIG. 9A shows the direction of rotation of the hologram recording medium. FIG. 9B shows the plane of polarization of the reference light on the photopolymer layer in the hologram recording medium. FIG. 9C shows the plane of polarization of the object light on the photopolymer layer.

FIG. 12A is a front view of the optical system of the holographic stereogram producing device. FIG. 12B is a plan view of the optical system of the holographic stereogram producing device.

BEST MODE FOR CARRYING OUT THE INVENTION

Embodiments to which the present invention is applied will now be described in detail with reference to the drawings.

In the following embodiment, the present invention is applied to a holographic stereogram producing device for producing a holographic stereogram by sequentially exposure-recording interference fringes in a strip-like or dot-like form on a hologram recording medium made of a photosensitive film.

The holographic stereogram producing device to which the present invention is applied can produce a holographic stereogram based on reproduction of bright holographic stereogram images by avoiding reduction in interference between object light and reference light due to double refraction of the hologram recording medium.

Prior to the description of the holographic stereogram producing device, the principle of exposure-recording of element holograms on the hologram recording medium will be described first.

Figure 1:
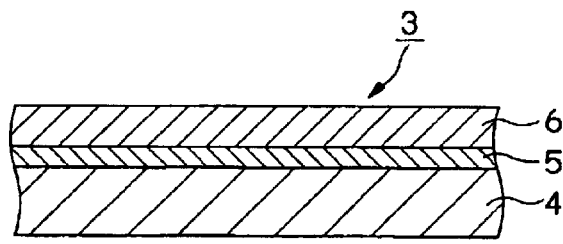
FIG. 1 is a cross-sectional view of essential parts for explaining a hologram recording medium used in a holographic stereogram producing device to which the present invention is applied.

As shown in FIG. 1, a hologram recording medium 3 is a so-called film-coated recording medium, which is produced by forming a photopolymer layer 5 as a recording layer made of a photopolymerization-type photopolymer on a base film 4 as a supporting material made of, for example, a polyethylene terephthalate (hereinafter referred to as PET) film, and then applying a cover film 6 as a supporting material made of, for example, a PET film, on the photopolymer layer 5.

Figure 2A:
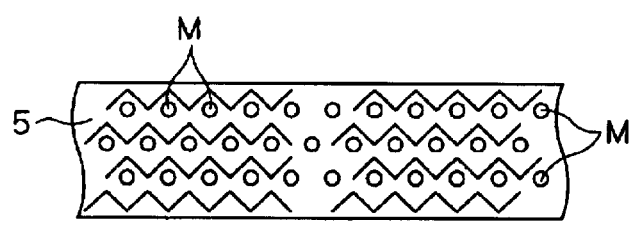
FIGS. 2A to 2C are views for explaining a photo-sensing process of the hologram recording medium according to the present invention.
Figure 2B:
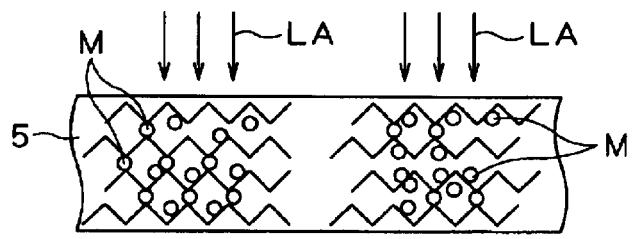
Figure 2C:
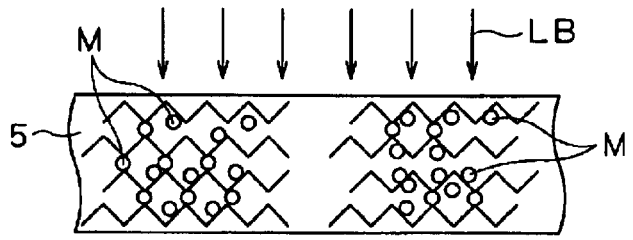

In such a hologram recording medium 3, monomers M are evenly distributed in a matrix polymer of the photopolymerization-type photopolymer constituting the photopolymer layer 5 in the initial state, as shown in FIG. 2A. When a laser beam LA with power of 10 mJ/cm$^2$ to 400 mJ/cm$^2$ is cast on the photopolymerization-type photopolymer, the monomers M evenly dispersed in the matrix polymer are polymerized at an exposed part, as shown in FIG. 2B.

As the photopolymerization-type photopolymer is polymerized, unevenness in concentration of the monomers M due to the migration of the surrounding monomers M causes modulation in refractive index between the exposed part and a non-exposed part. After that, when an ultraviolet ray or visible light LB with power of approximately 1000 mJ/cm$^2$ is cast on the photopolymerization-type photopolymer, the polymerization of the monomers M in the matrix polymer is completed. In the hologram recording medium 3, since the refractive index of the photopolymerization-type photopolymer constituting the photopolymer layer 5 is thus changed in accordance with the incident laser beam LA, interference fringes generated by interference between object light and reference light are exposure-recorded as a change in refractive index.

Since the holographic stereogram producing device uses, as the hologram recording medium 3, the film-coated recording medium having the photopolymer layer 5 made of such a photopolymerization-type photopolymer, a step of performing particular development processing on the hologram recording medium 3 is not necessary after exposure. Therefore, in the holographic stereogram producing device, simplification of its structure can be realized by not having to include a developing unit or the like, and a holographic stereogram can be quickly produced.

As a method for reducing the influence of double refraction caused by the base film 4 and the cover film 6 of the hologram recording medium 3 so as to improve the coherence between object light and reference light, it may be considered to peel off both the base film 4 and the cover film 6 and then carry out exposure-recording. However, this method is not preferred in consideration of rigidity because the photopolymer layer 5 is directly exposed to outside.

Figure 3:
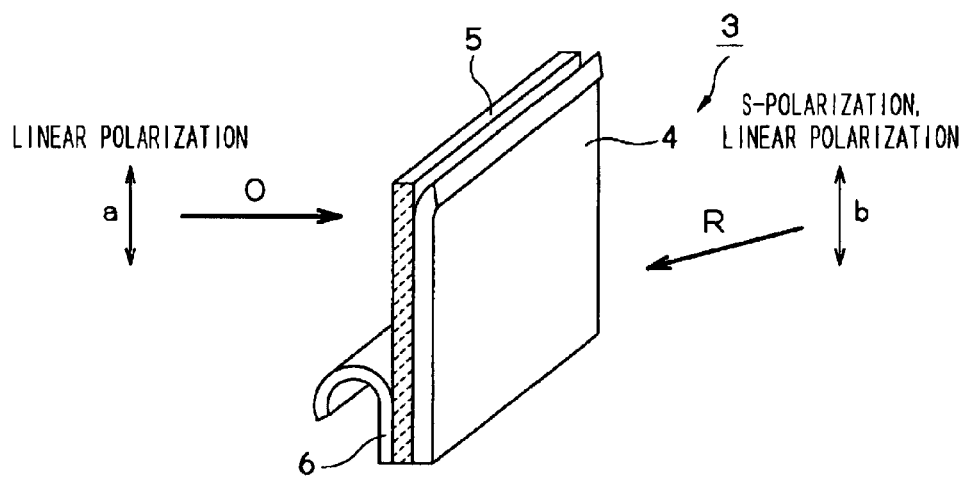
FIG. 3 is a conceptual view for explaining the polarization states of object light and reference light incident on the hologram recording medium when peeling off a cover film of the hologram recording medium and performing exposure-recording.

Thus, as another method for reducing the influence of double refraction caused by the base film 4 and the cover film 6 of the hologram recording medium 3, it may be considered to peel off at least one of the base film 4 and the cover film 5 and then carry out exposure-recording. For example, it is now assumed that a major surface of the hologram recording medium 3 irradiated with reference light R is the side of the base film while a major surface irradiated with object light O is the side of the cover film 6, and that the cover film 6 is peeled off to carry out exposure-recording, as shown in FIG. 3. In this case, the object light O is linearly polarized with its direction of light wave oscillation indicated by an arrow a in FIG. 3 and then becomes incident on the hologram recording medium 3. The reference light R is linearly S-polarized with its direction of light wave oscillation indicated by an arrow b in FIG. 3 and then becomes incident on the hologram recording medium 3.

Figure 4:
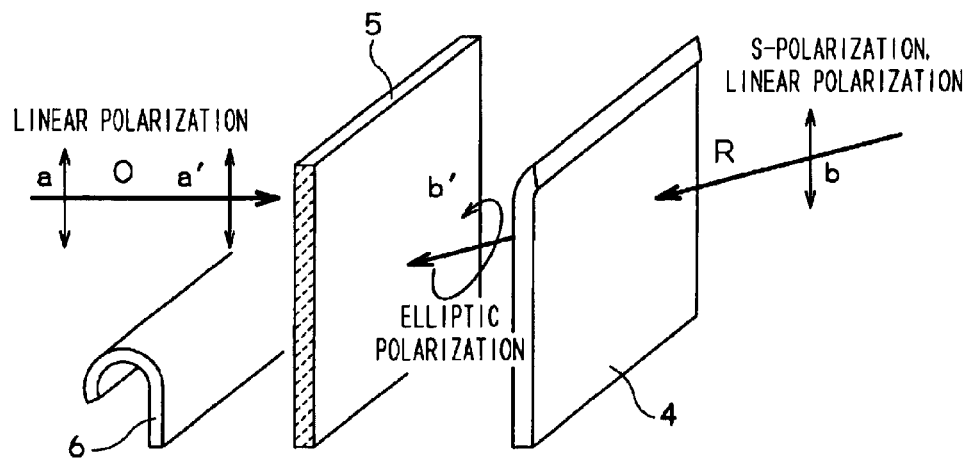
FIG. 4 is a conceptual view for explaining the polarization states of object light and reference light when peeling off the cover film of the hologram recording medium and performing exposure-recording.

In this case, as shown in FIG. 4, the object light O in the linear polarization state is not affected by double refraction and becomes incident on the photopolymer layer 5 while keeping its polarization state unchanged with its direction of light wave oscillation indicated by an arrow a' in FIG. 4. Therefore, no problem arises. On the other hand, though the reference light R in the linear S-polarization state becomes incident on the base film 4, the reference light R is affected by double refraction due to the base film 4 when passing through the base film 4. The reference light R thus changes to elliptically polarized light with its direction of light wave oscillation indicated by an arrow b' in FIG. 4 and deviates from its ideal polarization state. From an experiment, the present applicant confirmed that the degree of deviation of the reference light R from linear polarization depends largely on the base film 4. Specifically, it was confirmed that in the case where the base film 4 has a thickness of, for example, 50 micrometers, the polarization state of the reference light R significantly changes when the installation angle of the base film 4 to the cast reference light R is inclined only by approximately one degree. A large change in coherence with the object light O was confirmed, too. In other words, even when the base film 4 is carefully selected to try to reduce the influence of double refraction, the selection standard is impractically strict. Moreover, in the holographic stereogram producing device, the hologram recording medium 3 need be fed intermittently by one element hologram at the time of exposure-recording, as will be described later, and the allowance of the inclination of the hologram recording medium 3 due to intermittent feeding is limited, that is, the angular precision of the hologram recording medium 3 must be very high. This is not preferred for practical applications.

As still another method for reducing the influence of double refraction caused by the base film 4 and the cover film 6 of the hologram recording medium 3, it may be considered to replace the material of at least the cover film 6 with a material having less double refraction. In this method, however, a similar problem arises with respect to the coherence between the object light O and the reference light R. This is not advantageous.

Thus, when causing the reference light R to be incident in the linear polarization state on the hologram recording medium 3, the present applicant carried out inverse correction by changing the polarization state of the reference light R in advance so that the highest coherence could be obtained between the reference light R and the object light O passed through the base film 4 to reach the photopolymer layer 5.

Figure 5A:
FIGS. 5A to 5C are conceptual views for explaining the planes of polarization of object light and reference light in order to explain inverse correction carried out by inclining the plane of polarization of the reference light in advance.
Figure 5B:
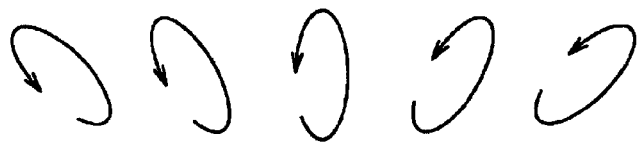
Figure 5C:
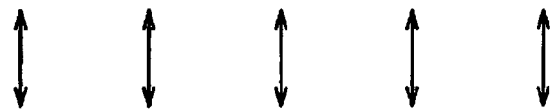

Specifically, if the plane of polarization of the linearly polarized reference light R incident on the hologram recording medium 3 is changed as indicated by the direction of light wave oscillation shown in FIG. 5A, also the plane of polarization of the elliptically polarized reference light R passed through the base film 4 to reach the photopolymer film 5 changes accordingly as indicated by the direction of light wave oscillation shown in FIG. 5B. As the cover film 6 is peeled off from the hologram recording medium 3, the object light O becomes incident on the hologram recording medium 3 with its plane of linear polarization kept unchanged, as indicated by the direction of light wave oscillation shown in FIG. 5C. Therefore, when the product of a vector representing the plane of polarization in the long-axis direction of the elliptically polarized reference light R, which has reached the photopolymer layer 5, and a vector representing the plane of polarization of the linearly polarized object light O, which has reached the photopolymer layer 5, reaches the maximum, that is, when the long-axis direction of elliptic polarization of the reference light R and the direction of linear polarization of the object light O are coincident with each other on the photopolymer layer 5, the highest coherence is obtained and the highest contrast of interference fringes exposure-recorded on the photopolymer layer 5 is obtained. Thus, bright holographic stereogram images can be provided.

Figure 6:
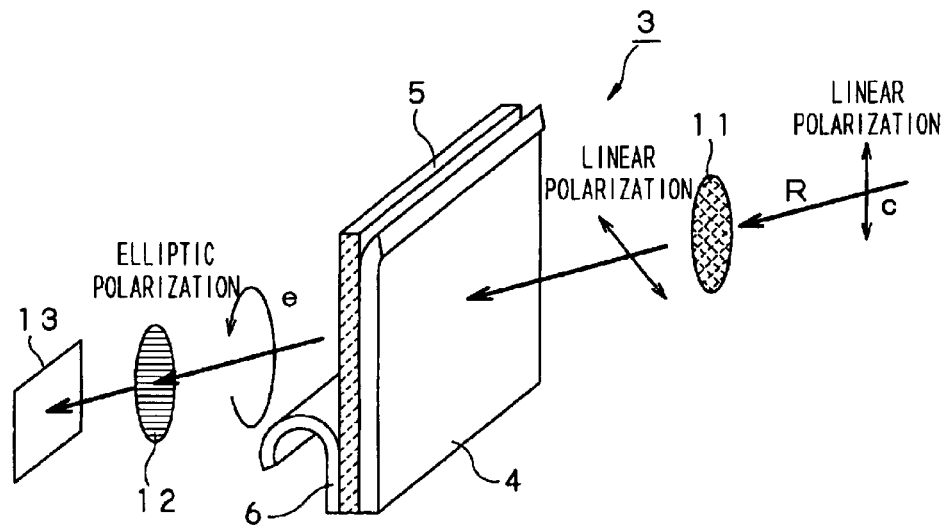
FIG. 6 is a view for explaining the structure of a inverse correction system for performing the inverse correction explained in FIGS. 5A to 5C.

As a method for carrying out such inverse correction, it may be considered to constitute an inverse correction system as shown in FIG. 6. The inverse correction system has the following elements: a half-wave plate 11, which is polarization state varying means for rotating the plane of polarization of the linearly polarized reference light R incident on the hologram recording medium 3; a polarizing plate 12, which is an optical element in polarization state detection means for transmitting only a component having a predetermined plane of polarization, of the reference light R double-refracted by transmission through the hologram recording medium 3; and a photodetector 13, which is intensity detection means in the polarization state detection means for detecting the intensity of the reference light R transmitted through the polarizing plate 12.

In such an inverse correction system, the plane of polarization of the linearly polarized reference light R with its direction of light wave oscillation indicated by an arrow c in FIG. 6 is rotated by the half-wave plate 11 arranged on its optical axis, and the reference light R with its plane of polarization rotated by a predetermined angle and with its direction of light wave oscillation indicated by an arrow d in FIG. 6 is made incident on the hologram recording medium 3. Moreover, in the inverse correction system, the reference light R double-refracted by transmission through a partial area of the hologram recording medium 3 is led to the polarizing plate 12. The polarizing plate 12 is installed so that the minimum or maximum transmittance is provided when the reference light R has the same plane of polarization as the object light, not shown in FIG. 6. In the inverse correction system, an optical element such as a polarization beam splitter which performs a similar function may be provided instead of the polarizing plate 12. In the inverse correction system, the intensity of the reference light R transmitted through the polarizing plate 12 is detected by the photodetector 13. That is, in the inverse correction system, the polarization state of the reference light R is detected by the polarizing plate 12 and the photodetector 13. The inverse correction system decides the rotation angle of the half-wave plate 11 so that the intensity of the reference light R detected by the photodetector 13 reaches the minimum or maximum.

With such a structure, the inverse correction system can perform inverse correction by inclining the plane of polarization of the reference light R so that the highest coherence is obtained between the object light O and the reference light R which have reached the photopolymer layer 5.

By using such an inverse correction system when producing a holographic stereogram, the holographic stereogram producing device produces a holographic stereogram for reproducing a bright holographic stereogram image. This holographic stereogram producing device will now be described. In the following description, the holographic stereogram producing device produces a holographic stereogram having parallax information in the lateral direction by exposure-recording a plurality of strip-like element holograms onto one hologram recording medium. However, the holographic stereogram producing device may also produce a holographic stereogram having parallax information in lateral and longitudinal directions by exposure-recording a plurality of dot-like element holograms onto one hologram recording medium.

Figure 7:
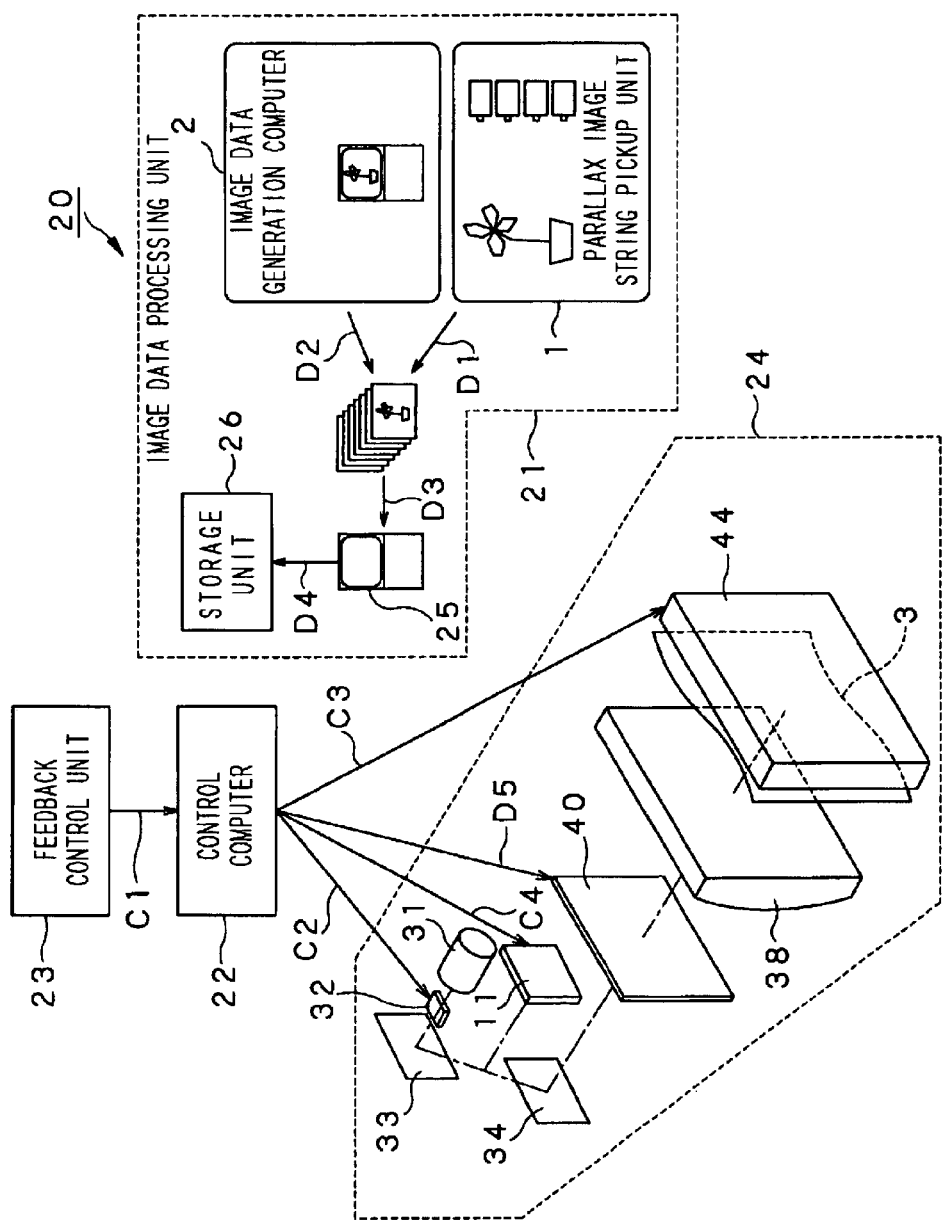
FIG. 7 is a view for explaining the overall structure of a holographic stereogram producing device to which the inverse correction system shown in FIG. 6 is applied.

For example, as shown in FIG. 7, a holographic stereogram producing device 20 is adapted for exposure-recording holographic stereogram images onto the above-described hologram recording medium 3 made of a photosensitive film. The holographic stereogram producing device 20 has an image data processing unit 21 for precessing image data of an exposure-recording object, a control computer 22 for performing general control of the holographic stereogram producing device 20, a feedback control unit 23 for performing feedback control, which will be described later, and a holographic stereogram producing unit 24, which is exposure-recording means having an optical system for producing a holographic stereogram.

The image data processing unit 21 has at least an image processing computer 25 and a storage unit 26, and generates a parallax image data string D3 on the basis of image data such as picked-up image data D1 including parallax information supplied from a parallax image string pickup unit 1 having, for example, a multiple-lens camera or a movable camera, and computer image data D2 including parallax information generated by an image data generation computer 2.

The picked-up image data D1 is a plurality of image data obtained by, for example, simultaneous shooting by a multiple-lens camera or continuous shooting by a movable camera. Parallax information is included between image data constituting the picked-up image data D1. The computer image data D2 is a plurality of image data prepared, for example, as CAD (computer-aided design) or CG (computer graphics). Parallax information is included between the image data constituting the computer image data D2.

The image data processing unit 21 performs predetermined image processing for holographic stereogram on the parallax image data string D3 based on these picked-up image data D1 and/or computer image data D2, by using the image processing computer 25, and thus generates hologram image data D4. The hologram image data D4 is temporarily stored in the storage unit 26 such as a memory or a hard disk unit. As will be described later, when exposure-recording element hologram images onto the hologram recording medium 3, the image data processing unit 21 sequentially reads out element hologram image data D5 for respective image from the hologram image data D4 stored in the storage unit 26 and supplies these element hologram image data D5 to the control computer 22.

The control computer 22 controls the holographic stereogram producing unit 24 to sequentially exposure-record element display images based on the element hologram image data D5 supplied form the image data processing unit 21, as strip-like element holograms, onto the hologram recording medium 3 provided at a part of the holographic stereogram producing unit 24. In this case, the control computer 22 controls the operation of each mechanism of the holographic stereogram producing unit 24, as will be described later. Particularly, the control computer 22 decides the rotation angle of the half-wave plate 11 in the holographic stereogram producing unit 24 and controls the plane of polarization of reference light L3 on the basis of a feedback signal C1 supplied from the feedback control unit 23, as will be described later.

The feedback control unit 23 generates a feedback signal C1 for controlling the rotation angle of the half-wave plate 11 on the basis of an intensity signal of reference light supplied from the holographic stereogram producing unit 24, as will be described later. The feedback control unit 23 supplies the generated feedback signal C1 to the control computer 22.

In the holographic stereogram producing unit 24, members constituting its optical systems are arranged and supported on a supporting board (optical board), not shown, and this supporting board is supported in a device casing via a damper or the like, not shown. The holographic stereogram producing unit 24 has an incident optical system, a object optical system and a reference optical system, as optical systems for producing holographic stereograms. Since the holographic stereogram producing device 20 uses the hologram recording medium 3 made of a photosensitive material, the device casing has a structure that maintains the shielding property of at least the optical systems.

The holographic stereogram producing unit 24 has, as the incident optical system, a laser light source 31 for emitting a laser beam with a predetermined wavelength, a shutter mechanism 32 arranged on the optical axis of a laser beam L1 from the laser light source 31 and adapted for causing the laser beam L1 to be incident on the next stage or shielding the next stage from the laser beam L1, and a half mirror 33 for splitting the laser beam L1 into object light L2 and reference light L3, as shown in FIG. 8A.

The laser light source 31 is made up of a laser device such as a semiconductor-excited YAG laser device for emitting the laser beam L1 with a single wavelength and high coherence, a water-cooled argon ion laser device, or a water-cooled krypton laser device. The laser light source 31 emits the laser beam L1, which is linearly S-polarized light.

The shutter mechanism 32 operates to open or close in accordance with a control signal C2 outputted from the control computer 22, corresponding to output timing of the element hologram image data D5, and thus causes the laser beam L1 to be incident on the optical system on the next stage or shields the optical system on the next stage from the incidence of the laser beam L1.

The half mirror 33 splits the incident laser beam L1 into transmitted light and reflected light. The transmitted light of the laser beam L1 is used as the above-described object light L2 and the reflected light is used as the reference light L3. These object light L2 and reference light L3 become incident on the object optical system and the reference optical system, respectively, provided on the subsequent stage.

In order to appropriately change the traveling direction of the laser beam L1 and realize the same optical path length of the object light L2 and the reference light L3, a mirror or the like may be provided in the incident optical system, though not shown. The shutter mechanism 32 may also be constituted to, for example, mechanically drive a shutter piece, or may be constituted by an electronic shutter using an acousto-optic modulator (AOM). That is, the shutter mechanism 32 may be any shutter mechanism that can freely open and close and enables shielding and transmission of the laser beam L1.

The holographic stereogram producing unit 24 also has, as the object optical system, optical parts such as a mirror 34, a spatial filter 35, a collimating lens 36, a projection lens 37, a cylindrical lens 38, and a mask 39, as shown in FIGS. 8A and 8B. These optical parts are sequentially arrayed from the input side along the optical axis.

The mirror 34 reflects the object light L2 transmitted through the half mirror 33. The object light L2 reflected by the mirror 34 becomes incident on the spatial filter 35.

The spatial filter 35 is constituted by, for example, a combination of a convex lens and a pinhole. The spatial filter 35 isotropically expands the object light L2 reflected by the mirror 34, corresponding to the width of a display surface of a transmission-type liquid crystal display unit 40, which will be described later.

The collimating lens 36 collimates the object light L2 expanded by the spatial filter 35, and leads the collimated light to the transmission-type liquid crystal display unit 40.

The projection lens 37 slightly diffuses the object light L2 and projects the diffused object light L2 on the cylindrical lens 38. By slightly diffusing the object light L2, this projection lens 37 contributes to improvement in the image quality of a holographic stereogram to be produced.

The cylindrical lens 38 condenses the collimated object light L2 in the lateral direction.

The mask 39 has a strip-like aperture and causes light transmitted through the aperture, of the object light L2 condensed by the cylindrical lens 38, to be incident on the hologram recording medium 3 with the cover film 6 peeled off.

In the object optical system, the transmission-type liquid crystal display unit 40 is arranged between the collimating lens 36 and the projection lens 37. On the transmission-type liquid crystal display unit 40, element hologram images are sequentially displayed on the basis of the element hologram image data D5 supplied from the control computer 22. The control computer 22 supplies a driving signal C3 to a recording medium feed mechanism 44 for the hologram recording medium 3, which will be described later, corresponding to the output timing of the element hologram image data D5, and controls the operation of the recording medium feed mechanism 44, thereby controls the feed operation of the hologram recording medium In such an object optical system, the object light L2, which is narrow beam-like linearly polarized light that is split and incident from the incident optical system, is expanded by the spatial filter 35 and then becomes incident on the collimating lens 36, thus being collimated. Moreover, in the object optical system, the object light L2 incident on the transmission-type liquid crystal display unit 40 via the collimating lens 36 is image-modulated in accordance with the element hologram images displayed on the transmission-type liquid crystal display unit 40, and becomes incident on the cylindrical lens 38 via the projection lens 37. In the object optical system, while the shutter mechanism 32 is opened, the image-modulated object light L2 is caused to be incident on the hologram recording medium 3 via the aperture of the mask 39 and exposure-recording corresponding to the element hologram images is performed.

Moreover, the holographic stereogram producing unit 24 also has, as the reference optical system, the half-wave plate 11, a spatial filter 41, a collimating lens 42, and a mirror 43. These optical parts are sequentially arrayed from the input side along the optical axis.

The half-wave plate 11 is, for example, a mica wave plate constituting the above-described inverse correction system. The half-wave plate 11 rotates the plane of polarization of the reference light L3, which is linearly S-polarized light that is reflected and split by the half mirror 43, by a predetermined angle about the optical axis as the center of rotation. In this case, the half-wave plate 11 is rotationally driven to have high precision and reproducibility by a rotation mechanism, not shown, based on motor driving, in response to a control signal C4 outputted from the control computer 22. Thus, the half-wave plate 11 rotates the plane of polarization of the reference light L3 by a predetermined angle.

The spatial filter 41 is constituted by, for example, a combination of a cylindrical lens and a slit, unlike the spatial filter 35 in the above-described object optical system. The spatial filter 41 expands the linearly S-polarized reference light L3 having the plane of polarization of the predetermined angle transmitted through the half-wave plate 11, in a one-dimensional direction in accordance with a predetermined width, specifically, the width of the display surface of the transmission-type liquid crystal display unit 40.

The collimating lens 42 collimates the reference light L3 expanded by the spatial filter 41.

The mirror 43 reflects the reference light L3 to lead the reference light L3 behind the hologram recording medium 3, thus causing the reference light L3 to be incident on the hologram recording medium 3.

In the holographic stereogram producing unit 24 having such optical systems, the object optical system, through which the object light L2 split by the half mirror 33 is transmitted, and the reference optical system, through which the reference light L3 is transmitted, have substantially the same optical path length. Therefore, in the holographic stereogram producing unit 24, the coherence between the object light L2 and the reference light L3 is improved and a holographic stereogram for obtaining a clearer reproduction image can be produced.

Moreover, the holographic stereogram producing device 20 has the recording medium feed mechanism 44 for intermittently feeding the hologram recording medium 3 by one element hologram in a direction indicated by an arrow f in FIG. 8B.

The recording medium feed mechanism 44 intermittently drives the hologram recording medium 3 to travel, on the basis of the driving signal C3 supplied from the control computer 22. In the holographic stereogram producing device 20, the shutter mechanism 32 is caused to operate to open the optical path of the laser beam L1 on the basis of the control signal C2 supplied from the control computer 22 interlocked with the operation of the recording medium feed mechanism 44.

Furthermore, the holographic stereogram producing device 20 has the polarizing plate 12 and the photodetector 13, which constitute the above-described inverse correction system.

The polarizing plate 12 is installed so that the transmittance reaches the minimum or maximum when the reference light L3 has the same plane of polarization as the object light L2, as described above. The polarizing plate 12 transmits only a component having a predetermined plane of polarization, of the reference light L3 that is transmitted and double-refracted through a partial area of the hologram recording medium 3.

The photodetector 13 detects the intensity of the reference light L3 transmitted through the polarizing plate 12, as described above. The photodetector 13 supplies an intensity signal indicating the detected intensity of the reference light L3 to the feedback control unit 23.

In such a holographic stereogram producing device 20, as the driving signal C3 corresponding to one element hologram is supplied to the recording medium feed mechanism 44 from the control computer 22 on completion of each exposure-recording of one element image, the hologram recording medium 3 is driven to travel along the traveling path by the quantity corresponding one element hologram and is stopped with a non-exposed part facing the aperture of the mask 39. The holographic stereogram producing device 20 is so constituted as to quickly stop oscillation generated in the hologram recording medium 3 due to the traveling operation of the hologram recording medium 3. The hologram recording medium 3 is made of a long photosensitive film and is wound on a supply roll that is rotatably provided inside a filter cartridge entirely shielded from light. When the film cartridge is loaded in the holographic stereogram producing device 20, the hologram recording medium 3 is led out into the holographic stereogram producing device 20 and driven to travel on the traveling path by the recording medium feed mechanism 44.

In the holographic stereogram producing device 20, the shutter mechanism 32 is opened in this state, and the image-modulated object light L2 and the reference light L3 are caused to be incident on the hologram recording medium 3 from both sides of the hologram recording medium 3, thus exposure-recording interference fringes corresponding to an element hologram image. In the holographic stereogram producing device 20, when exposure-recording of one element image is completed, the driving signal C3 is supplied to the recording medium feed mechanism 44 from the control computer 22, and the hologram recording medium 3 is quickly driven to travel by a predetermined quantity and then stopped.

In this case, in the holographic stereogram producing device 20, the feedback control unit 23 generates the feedback signal C1 so that the intensity of the reference light L3 detected by the photodetector 13 reaches the minimum or maximum, as described above, and on the basis of this feedback signal C1, the half-wave plate 11 is rotated in response to the control signal C4 from the control computer 22. Normally, the holographic stereogram producing device 20 does not frequently require control feedback for the rotation of the half-wave plate 11. That is, in the holographic stereogram producing device 20, since changes in double refraction due to the base film 4 of the hologram recording medium 3 are usually not very acute, feedback control may be carried out for each exposure-recording of one holographic stereogram image or for each exposure-recording of a plurality of holographic stereogram images.

For example, in the holographic stereogram producing device 20, when exposure-recording of one holographic stereogram image is completed, a mark for identifying the boundary with the next holographic stereogram image to be exposure-recorded is separately exposure-recorded at a predetermined spacing. Feedback control can be carried out along with this exposure-recording.

In the holographic stereogram producing device 20, for example, exposure-recording of a predetermined number of holographic stereogram images is regarded as one cycle, and during the cycle, the polarization state of the reference light L3 may be continuously detected by the polarizing plate 12 and the photodetector 13. Statistical information such as time average value of the intensity of the reference light L3 may be calculated by the feedback control unit 23 and the half-wave plate 11 may be rotated on the basis of this statistical information.

In the holographic stereogram producing device 20, since the number of occasions which require feedback control varies depending on various elements such as unevenness in type and quality of the hologram recording medium 3, instead of carrying out feedback control in a predetermined cycle, whether feedback control should be carried out may be arbitrarily selected in accordance with the situation, on condition that feedback control is carried out except during exposure-recording of holographic stereogram images. For example, in the holographic stereogram producing device, during exposure-recording of at least one or more holographic stereogram images, the polarization state of the reference light L3 is constantly and continuously detected by the polarizing plate 12 and the photodetector 13. If the polarization state is deviated from a predetermined polarization state, that is, if the intensity of the reference light L3 detected by the photodetector 13 is not more than or not less than a predetermined value, it is determined that the coherence between the object light L2 and the reference light L3 is lowered to less than an allowable level and feedback control can be carried out. In this case, in the holographic stereogram producing device 20, statistical information such as time average value of the intensity of the reference light L3 detected by the photodetector 13 is calculated by the feedback control unit 23 and the half-wave plate 11 may be rotated on the basis of this statistical information.

In the holographic stereogram producing device 20, feedback control may be carried out for each exposure-recording of an element hologram. In this case, in the holographic stereogram producing device 20, a laser beam that is identical with the reference light L3 must be separately cast on the hologram recording medium 3. Specifically, in the holographic stereogram producing device 20, the reference light L3 transmitted through at least the half-wave plate 11 is branched, though not shown, and the branched light may be cast to be transmitted through an area other than the holographic stereogram image recording area in the hologram recording medium 3. In this case, the laser beam cast on the hologram recording medium 3 separately from the reference light L3 need be identical with the reference light L3, and it should be noted that not only the wavelength but also all the conditions including the optical path length and incident angle on the hologram recording medium 3 must be the same.

In the holographic stereogram producing device 20 according to the present invention, while the shutter mechanism 32 is opened and the object light L2 and the reference light L3 are being cast on the hologram recording medium 3, that is, while element holograms or holographic stereogram images are being exposure-recorded, the half-wave plate 11 is not rotated. When the shutter mechanism 32 is closed and the object light L2 and the reference light L3 are not cast on the hologram recording medium 3, the half-wave plate 11 is rotated.

In the holographic stereogram producing device 20, after such exposure-recording of holographic stereogram images, a fixing processing unit, not shown, carries out fixing processing including ultraviolet irradiation processing on the hologram recording medium and heating processing at a predetermined temperature on the hologram recording medium 3, thereby fixing the holographic stereogram images exposure-recorded on the hologram recording medium 3. In the holographic stereogram producing device 20, the hologram recording medium 3 on which fixing processing has been performed is sequentially cut out to a predetermined size for each holographic stereogram image and is ejected outward as one holographic stereogram.

By sequentially carrying out these operations, the holographic stereogram producing device 20 sequentially exposure-records a plurality of holographic stereogram images on the long hologram recording medium 3 and produces one holographic stereogram based on the exposure-recorded holographic stereogram images.

In this manner, in the holographic stereogram producing device 20, both the object light L2 and the reference light L3 are linearly polarized, and when causing the object light L2 to be incident on the one major surface of the hologram recording medium 3 from which the cover film 6 has been peeled off while causing the reference light L3 to be incident on the other major surface of the hologram recording medium 3 covered with the base film 4, inverse correction is carried out by inclining the plane of polarization of the reference light L3 so that the highest coherence between the reference light L3 and the object light L2 is obtained. Thus, instability in brightness of holographic stereogram images due to double refraction is eliminated and a holographic stereogram based on reproduction of bright holographic stereogram images can be produced.

In the holographic stereogram producing device 20 according to the present invention, the reference light L3 may be caused to be incident on the hologram recording medium 3 from which the base film 4 has been peeled of while the object light L2 may be caused to be incident on the side of the hologram recording medium 3 covered with the cover film 6, thus carrying out inverse correction by inclining the plane of polarization of the object light L2. However, it is preferred to carry out inverse correction by inclining the plane of polarization of the reference light L3, for the following reasons.

The first reason is that the object light L2 is condensed on the hologram recording medium 3, as shown in FIG. 8B. Specifically, since the condensed object light L2 is a collection of light waves having multiple traveling directions, it has various incident angles to the hologram recording medium 3. Double refraction changes at every moment depending on the incident angle. Therefore, when carrying out inverse correction by inclining the plane of polarization of the object light L2, it is difficult to discriminate the traveling direction of the light wave having the intensity detected by the polarizing plate 12 and the photodetector 13, of the of the condensed object light L2. As a result, in the holographic stereogram producing device 20, it is difficult to detect the intensity of the object light L2. On the other hand, when carrying out inverse correction by inclining the plane of polarization of the reference light L3, no such program arises since the reference light L3 is incident on the hologram recording medium 3 as collimated light.

The second reason is the existence of the transmission-type liquid crystal display unit 40. Specifically, since the holographic stereogram producing device 20 has the transmission-type liquid crystal display unit 40, the half-wave plate 11 for inclining the plane of polarization of the object light L2 must be installed on the stage subsequent to the transmission-type liquid crystal display unit 40. In such a structure having the half-wave plate 11 provided on the stage subsequent to the transmission-type liquid crystal display unit 40, the half-wave plate 11 having a size at least equal to or larger than the width of the display surface of the transmission-type liquid crystal display unit 40 is necessary in order to rotate the plane of polarization of the object light L2 isotropically expanded corresponding to the width of the display surface of the transmission-type liquid crystal display unit 40 by the spatial filter 35. This is not practical. On the other hand, when carrying out inverse correction by inclining the plane of polarization of the reference light L3, it suffices to prepare the half-wave plate 11 having a size enough to cover the narrow beam-like reference light L3 split by the half mirror 33.

The third reason is that the object light L2 becomes incident on the major surface of the hologram recording medium 3 directly from its front side, whereas the reference light L3 becomes incident on the major surface of the hologram recording medium 3 at a predetermined angle thereto, as shown in FIG. 8A. Specifically, double refraction due to the reference light L3 incident on the major surface of the hologram recording medium 3 at a predetermined angle thereto reacts and changes more sensitively to changes in installation angle of the hologram recording medium 3, than double refraction due to the object light L2 incident on the major surface of the hologram recording medium 3 directly from its front side. Therefore, in the holographic stereogram producing device 20, it is considered preferable to perform correction on the reference light L3 with largely changing double refraction.

For these reasons, it is practically significant to carry out inverse correction by inclining the plane of polarization of the reference light L3 in the holographic stereogram producing device 20.

As another method for reducing the influence of double refraction caused by the base film 4 and the cover film 6 of the hologram recording medium 3 to improve the coherence between object light and reference light, a method that is not based on the above-described inverse correction of the plane of polarization will now be proposed.

This method utilizes a wave plate-like function of the hologram recording medium 3 itself. Specifically, the present applicant has found that the hologram recording medium 3 itself has a property to rotate the plane of polarization similarly to a wave plate and thus change the polarization state. Thus, the present applicant carried out inverse correction by rotating the hologram recording medium 3 in the inner direction of the major surface of the hologram recording medium 3 so that the highest coherence could be obtained between the reference light R and the object light o transmitted through the base film 4 to reach the photopolymer layer 5, when causing the linearly polarized reference light R to be incident on the hologram recording medium 3. If the hologram recording medium 3 maintains the polarization axis like crystal or mica, when the polarization axis and the plane of polarization of the reference light R coincide with each other, the reference light R incident as linearly polarized light maintains the linear polarization also when it is emitted from the hologram recording medium 3. Actually, the hologram recording medium 3 has different properties from crystal or mica and does not maintain the polarization axis, but high coherence can be obtained by the similar effect.

Figure 9A:
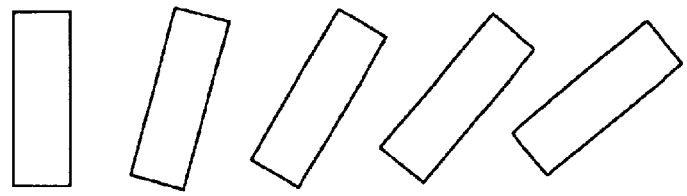
FIGS. 9A to 9C are conceptual views for explaining the direction of rotation of the hologram recording medium and the planes of polarization of object light and reference light in order to explain inverse correction carried out by rotating the hologram recording medium.
Figure 9B:
Figure 9C:

Specifically, FIG. 9A shows the direction of rotation of the hologram recording medium 3 as viewed directly in front of the major surface, and in accordance with the rotation of the hologram recording medium 3, the plane of polarization and the ellipticity of the elliptically polarized reference light R transmitted through the base film 4 to reach the photopolymer layer 5 change as indicated by the direction of light wave oscillation shown in FIG. 9B. The object light O becomes incident on the hologram recording medium 3 while holding its plane of linear polarization as indicated by the direction of light wave oscillation shown in FIG. 9C because the cover film 6 is peeled off from the hologram recording medium 3. Therefore, when the product of a vector representing the plane of polarization in the long-axis direction of the elliptically polarized reference light R that has reached the photopolymer layer 5 and a vector representing the plane of polarization of the linearly polarized object light O that has reached the photopolymer layer 5 reaches the maximum, that is, when the long-axis direction of the elliptically polarized reference light R and the direction of linear polarization of the object light O become coincident with each other on the photopolymer layer 5, the highest coherence is obtained and the highest contrast of interference fringes exposure-recorded onto the photopolymer 5 can be achieved. Thus, bright holographic stereogram images can be provided.

Figure 10:
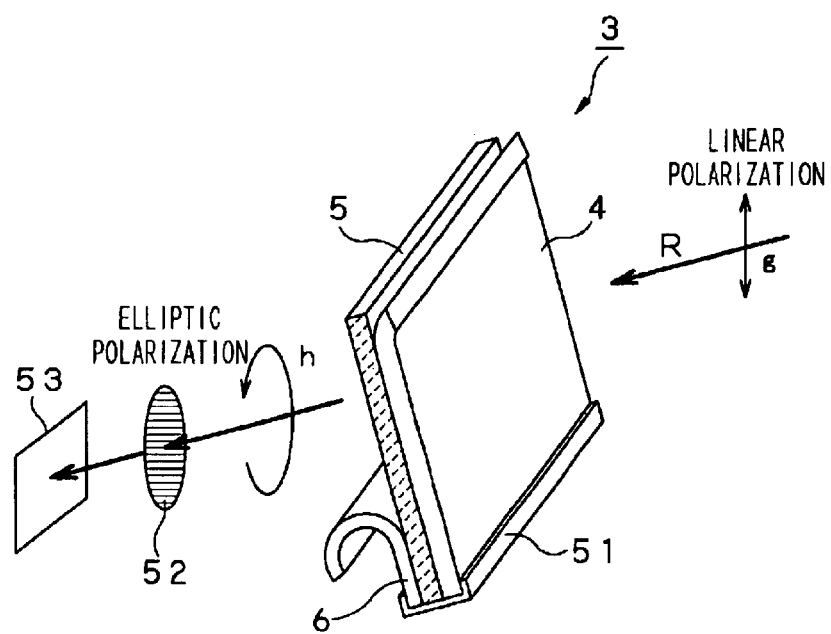
FIG. 10 is a view for explaining the structure of an inverse correction system for performing the inverse correction explained in FIGS. 9A to 9C.

As a method for carrying out such inverse correction, it may be considered to form an inverse correction system for the reference light R as shown in FIG. 10. The inverse correction system has a recording medium rotation mechanism 51, which is recording medium rotation means for rotating the hologram recording medium 3, a polarizing plate 52, which is an optical element in polarization state detection means for transmitting only a component having a predetermined plane of polarization of the reference light R transmitted and double-refracted through the hologram recording medium 3, and a photodetector 53, which is intensity detection means in the polarization state detection means for detecting the intensity of the reference light R transmitted through the polarizing plate 52.

Such an inverse correction system causes the linearly polarized reference light R to be incident on the hologram recording medium 3, with its direction of light wave oscillation indicated by an arrow g in FIG. 10. In this inverse correction system, the recording medium rotation mechanism 51 rotates the hologram recording medium 3 in the inner direction of the major surface of the hologram recording medium 3 and thus rotates the plane of polarization of the elliptically polarized reference light R by a predetermined angle with its direction of light wave oscillation indicated by an arrow h in FIG. 10, thus changing the polarization state. Moreover, in the inverse correction system, the reference light R transmitted and double-refracted through the hologram recording medium 3 is led to the polarizing plate 52. The polarizing plate 52, similar to the above-described polarizing plate 12, is installed so that the transmittance reaches the minimum or maximum when the reference light R has the same plane of polarization as the object light, not shown. In the inverse correction system, an optical element such as a polarization beam splitter which performs a similar function may be provided instead of the polarizing plate 52. Then, in the inverse correction system, the photodetector 53 detects the intensity of the reference light R transmitted through the polarizing plate 52. That is, in the inverse correction system, the polarizing plate 52 and the photodetector 53 detect the polarization state of the reference light R. The inverse correction system decides the rotation angle of the hologram recording medium 3 rotated by the recording medium rotation mechanism 51 so that the intensity of the reference light R detected by the photodetector 53 reaches the minimum or maximum.

With such a structure, the inverse correction system can perform inverse correction by rotating the hologram recording medium 3 to change the plane of polarization of the reference light R transmitted through the hologram recording medium 3 as closely to linear S-polarization as possible so that the highest coherence is obtained between the reference light R and the object light that have reached the photopolymer layer 5.

A holographic stereogram producing device to which such an inverse correction system is applied will now be described. In the following description, constituent elements similar to those of the above-described holographic stereogram producing device 20 are denoted by the same numerals and will now be described further in detail.

Figure 11:
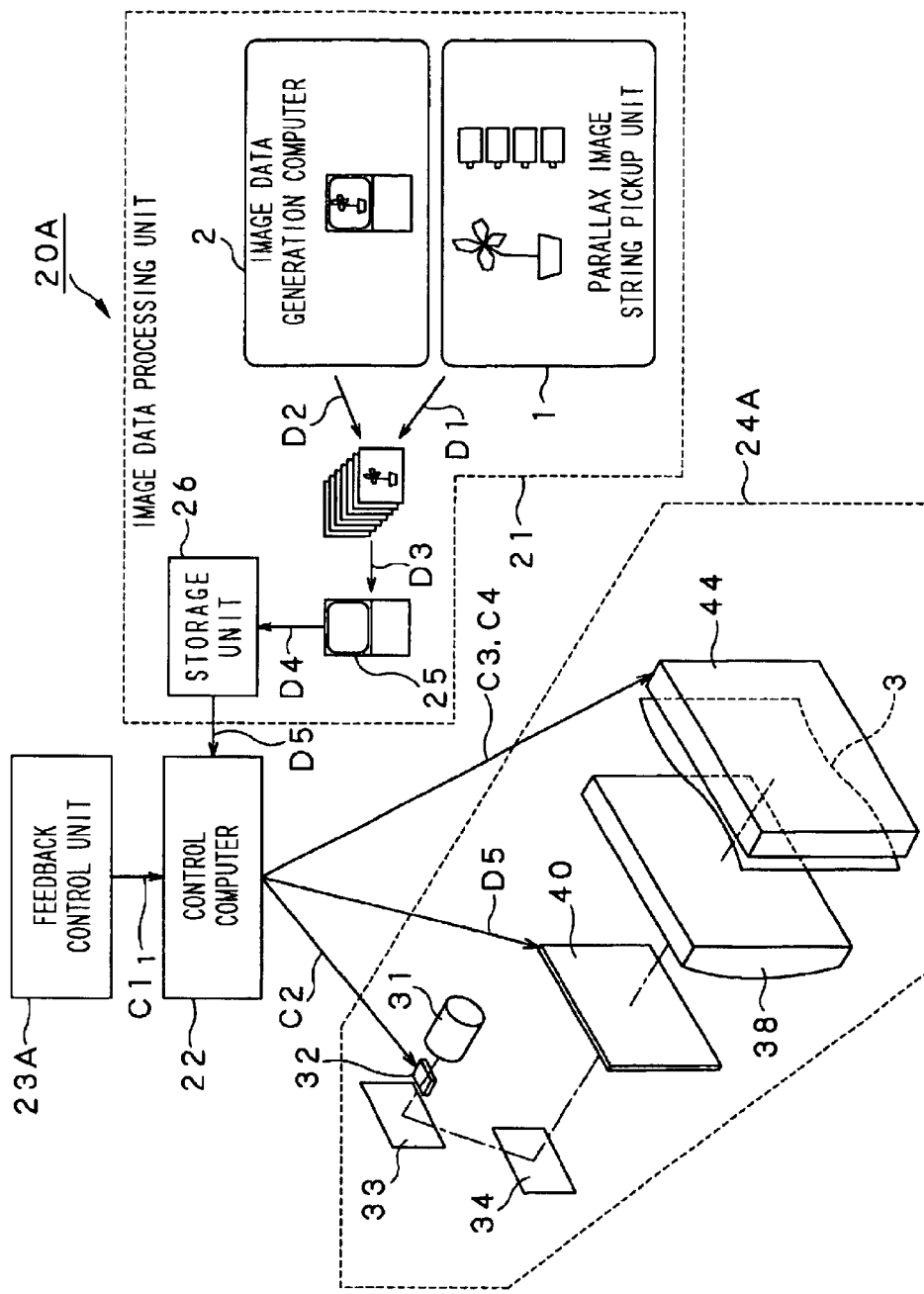
FIG. 11 is a view for explaining the overall structure of a holographic stereogram producing device to which the inverse correction system shown in FIG. 10 is applied.

For example, as shown in FIG. 11, a holographic stereogram producing device 20A has a feedback control unit 23A for performing feedback control, which will be described later, and a holographic stereogram producing unit 24A, which is exposure-recording means having an optical system for producing a holographic stereogram, in addition to the above-described image data processing unit 21 and control computer 22.

The control computer 22 controls the holographic stereogram producing unit 24A to sequentially exposure-record element display images based on element hologram image data D5 supplied form the image data processing unit 21, as strip-like element holograms, onto the hologram recording medium 3 provided at a part of the holographic stereogram producing unit 24A, as described above. Particularly, the control computer 22 decides the rotation angle of the hologram recording medium 3 installed in the holographic stereogram producing unit 24A on the basis of a feedback signal $C1_1$ supplied from the feedback control unit 23A, as will be described later, and controls the operation of the recording medium rotation mechanism 51 in the holographic stereogram producing unit 24A, thus controlling the polarization state of the reference light L3.

The feedback control unit 23A generates a feedback signal $C1_1$ for controlling the rotation angle of the hologram recording medium 3 on the basis of an intensity signal of reference light supplied from the holographic stereogram producing unit 24A, as will be described later. The feedback control unit 23A supplies the generated feedback signal $C1_1$ to the control computer 22.

Figures 12A, 12B:
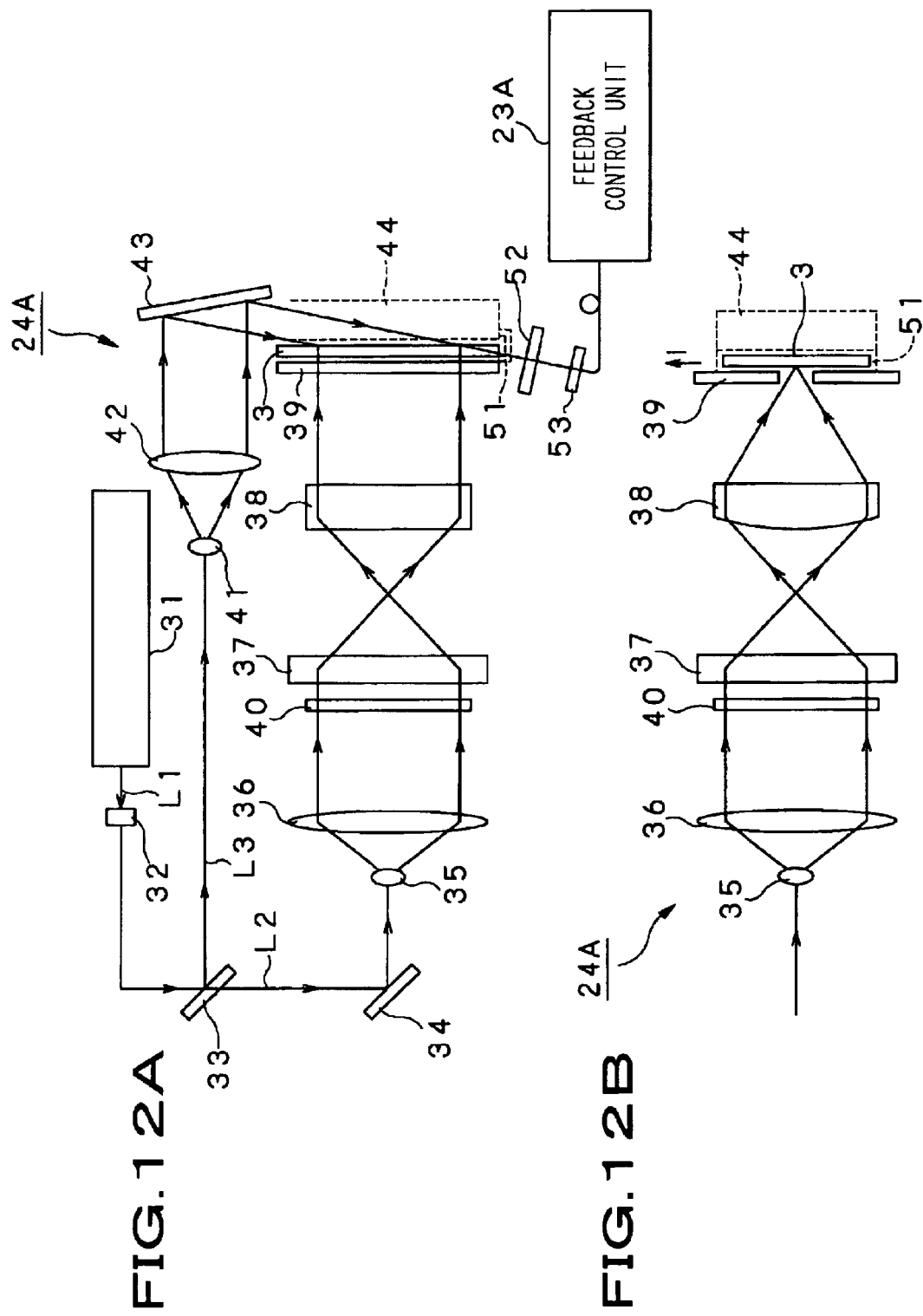
FIGS. 12A and 12B are views for explaining an optical system of the holographic stereogram producing device.

In the holographic stereogram producing unit 24A, an incident optical system and an object optical system have similar structures to those in the above-described holographic stereogram producing unit 24, as shown in FIGS. 12A and 12B, but a reference optical system does not have the above-described half-wave plate 11.

The holographic stereogram producing device 20A has the recording medium feed mechanism 44 for intermittently feeding the hologram recording medium 3 by one element hologram in a direction indicated by an arrow i in FIG. 12B.

The holographic stereogram producing device 20A has the recording medium rotation mechanism 51, the polarizing plate 52 and the photodetector 53, which constitute the above-described inverse correction system.

The recording medium rotation mechanism 51 rotates the hologram recording medium 3 by a predetermined angle in the inner direction of the major surface of the hologram recording medium 3, for example, about a center part of the major surface as the center of rotation in response to a control signal C4 outputted form the control computer 22. The center of rotation of the hologram recording medium 3 need not limited to the center part of the major surface, and the recording medium rotation mechanism 51 may use any point within the major surface as the center of rotation as long as the positions of the hologram recording medium 3 and an exposed part can be constantly aligned.

The polarizing plate 52, similar to the above-described polarizing plate 12, is installed so that the transmittance reaches the minimum or maximum when the reference light L3 has the same plane of polarization as the object light L2. The polarizing plate 52 transmits only a component having a predetermined plane of polarization, of the reference light L3 that is transmitted and double-refracted through a partial area of the hologram recording medium 3.

The photodetector 53, similar to the above-described photodetector 13, detects the intensity of the reference light L3 transmitted through the polarizing plate 52. The photodetector 53 supplies an intensity signal indicating the detected intensity of the reference light L3 to the feedback control unit 23A.

In such a holographic stereogram producing device 20A, similar to the above-described holographic stereogram producing device 20, as a driving signal C3 corresponding to one element hologram is supplied to the recording medium feed mechanism 44 from the control computer 22 on completion of each exposure-recording of one element image, the hologram recording medium 3 is driven to travel along the traveling path by the quantity corresponding one element hologram and is stopped with a non-exposed part facing the aperture of the mask 39. The hologram recording medium 3 is made of a long photosensitive film wound on a supply roll that is rotatably provided inside a filter cartridge, as described above. As the supply roll and a take-up roll for winding the led-out hologram recording medium 3 are held by the recording medium rotation mechanism 51, the rotation operation is carried out. In this case, in the holographic stereogram producing device 20A, there is a possibility that the direction of holographic stereogram images to be exposure-recorded on the major surface of the hologram recording medium 3 is unusually made oblique by rotating the hologram recording medium 3. Therefore, the hologram recording medium 3 is intermittently fed by the recording medium feed mechanism 44 while the intermittent feeding direction of the hologram recording medium 3 is appropriately corrected so as to prevent interruption of holographic stereogram images on the hologram recording medium 3.

In the holographic stereogram producing device 20A, the shutter mechanism 32 is opened in this state, and the image-modulated object light L2 and the reference light L3 are caused to be incident on the hologram recording medium 3 from both sides of the hologram recording medium 3, thus exposure-recording interference fringes corresponding to an element hologram image. In the holographic stereogram producing device 20A, when exposure-recording of one element image is completed, the driving signal C3 is supplied to the recording medium feed mechanism 44 from the control computer 22, and the hologram recording medium 3 is quickly driven to travel by a predetermined quantity and then stopped.

In this case, in the holographic stereogram producing device 20A, the feedback control unit 23A generates the feedback signal $C1_1$ so that the intensity of the reference light L3 detected by the photodetector 53 reaches the minimum or maximum, as described above, and on the basis of this feedback signal $C1_1$, the recording medium rotation mechanism 51 is operated in response to the control signal C4 from the control computer 22, thus rotating the hologram recording medium 3. As described above, in the holographic stereogram producing device 20A, feedback control for the rotation operation of the hologram recording medium 3 may be carried out for each exposure-recording of one holographic stereogram image or for each exposure-recording of a plurality of holographic stereogram images. Alternatively, feedback control may be carried out if the polarization state constantly and continuously detected by the polarizing plate 52 and the photodetector 53 is deviated from a predetermined polarization state during exposure-recording of at least one or more holographic stereogram images. Moreover, any of the above-described methods may be used.

In this manner, in the holographic stereogram producing device 20A, both the object light L2 and the reference light L3 are linearly polarized, and the object light L2 is made incident on the one major surface of the hologram recording medium 3 from which the cover film 6 has been peeled off while the reference light L3 is made incident on the other major surface of the hologram recording medium 3 covered with the base film 4. Inverse correction is carried out by rotating the hologram recording medium 3 to change the plane of polarization of the reference light L3 transmitted through the hologram recording medium 3 as closely to linear S-polarization as possible so that the highest coherence between the reference light L3 and the object light L2 is obtained. Thus, instability in brightness of holographic stereogram images due to double refraction is eliminated and a holographic stereogram based on reproduction of bright holographic stereogram images can be produced.

In the holographic stereogram producing device 20A, it is preferred to carry out inverse correction in accordance with the intensity of the reference light L3, for the reasons described above in the description of the holographic stereogram producing device 20.

In both of the above-described holographic stereogram producing devices 20, 20A, exposure-recording must be carried out in the state where the cover film 6 covering the one major surface of the hologram recording medium 3 irradiated with the object light is peeled off. Therefore, the complexity of the processing cannot be denied. Moreover, since both of the above-described holographic stereogram producing devices 20, 20A employ a technique of detecting the polarization state of the reference light transmitted and double-refracted through the hologram recording medium 3 by using the polarizing plates 12, 52 and the photodetectors 13, 53, the polarizing plates 12, 52 and the photodetectors 13, 53 must be separately provided as parts of the optical systems. Thus, a technique of detecting the plane of polarization of the reference light that realizes the highest coherence between the reference light and the object light, without having to peel off the cover film 6 and without providing the polarizing plates 12, 52 and the photodetectors 13, 53, will now be proposed.

In this technique, conditioning exposure-recording for deciding the optimum plane of polarization of the reference light for each exposure-recording of at least one or more holographic stereogram images, on the single long hologram recording medium 3. This technique can be applied to inverse correction of the plane of polarization of the reference light by rotating the half-wave plate 11 provided in the optical system or by rotating the hologram recording medium 3, as described above. The case where the half-wave plate 11 is provided in the optical system will now be described.

A holographic stereogram producing device to which this technique is applied has a structure similar to that of the holographic stereogram producing device 20 shown FIG. 7 and FIGS. 8A and 8B from which the polarizing plate 12, the photodetector 13 and the feedback control unit 23 have been eliminated. Therefore, in this case, the same constituent elements as in the above-described holographic stereogram producing device 20 are denoted by the same numerals and will not be described further in detail.

First, when a film cartridge in which the hologram recording medium 3 made of a long photosensitive film is wound is loaded, the holographic stereogram producing device carries out conditioning exposure-recording for deciding the rotation angle of the half-wave plate 11. In this conditioning exposure-recording, for example, a totally white image is displayed on the transmission-type liquid crystal display unit 40 as an element hologram image based on the above-described element hologram image data D5, and after the rotation angle of the half-wave plate 11 is set to a predetermined angle, a predetermined number of element holograms are exposure-recorded by using a laser beam transmitted through the transmission-type liquid crystal display unit 40 as the object light L2. In the conditioning exposure-recording, such an operation is carried out while changing the rotation angle of the half-wave plate 11, thus producing conditioning holographic stereogram images made up of element holograms exhibiting a plurality of degrees of brightness corresponding to gradual changes in rotation angle of the half-wave plate 11.

Figure 13:
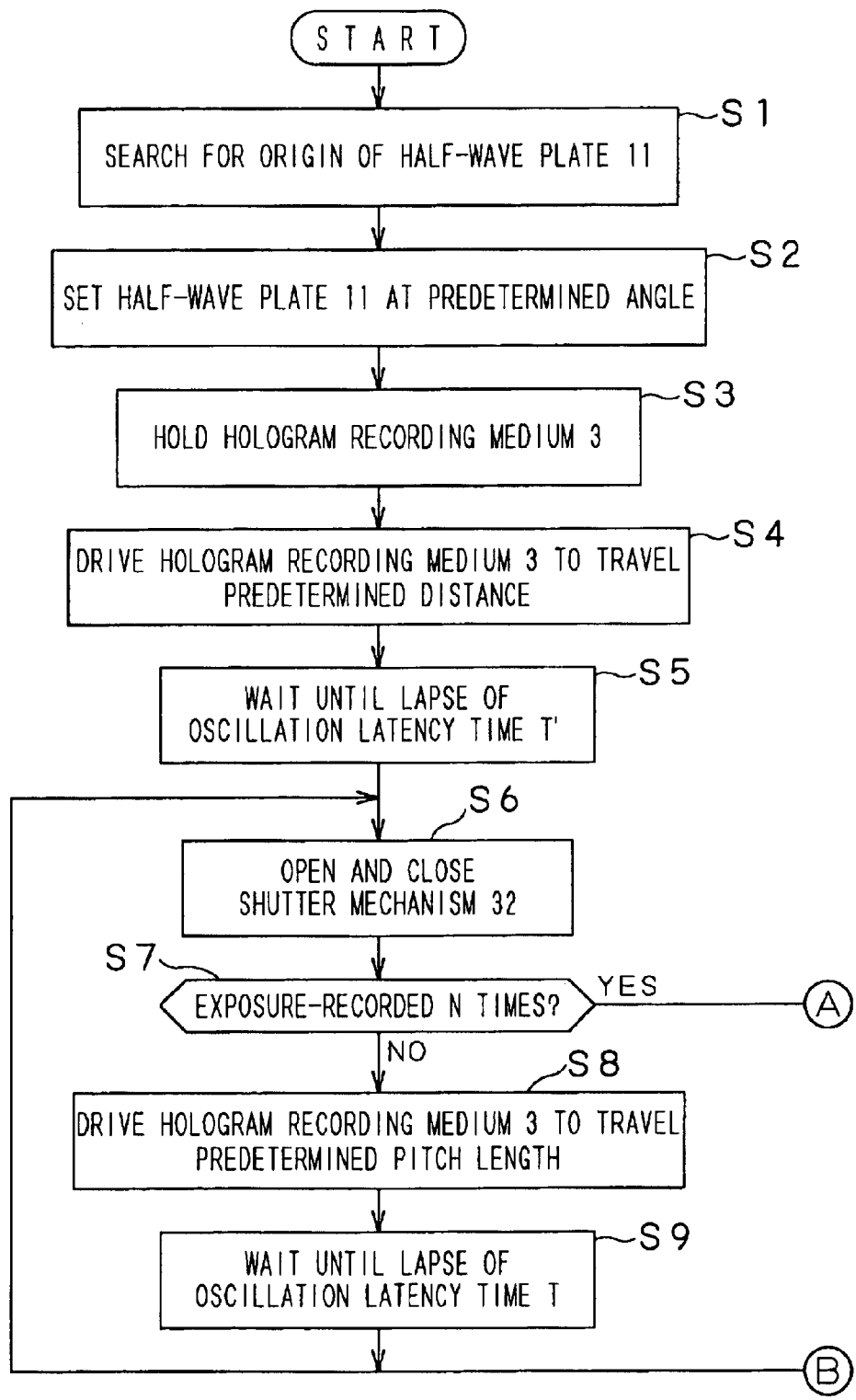
FIG. 13 is a flowchart for explaining a series of steps in performing conditioning exposure-recording in the holographic stereogram producing device.

Specifically, the holographic stereogram producing device carries out the conditioning exposure-recording through a series of steps shown in FIG. 13.

First, in the holographic stereogram producing device, at step S1, an origin as a reference point of the rotation angle of the half-wave plate 11 provided in the reference optical system is searched for, as shown in FIG. 13. This origin may be at any rotation angle. When the half-wave plate 11 is set at this origin, its rotation angle is assumed to be 0 degree. In the holographic stereogram producing device, after the origin of the half-wave plate 11 is found, the image data processing unit 21 and the control computer 22 enter standby states.

Then, in the holographic stereogram producing device, at step S2, the half-wave plate 11 is rotated and set at a predetermined angle on the basis of a control signal C4 outputted from the control computer 22. For example, it is desired that the half-wave plate 11 is set at −45 degrees in the holographic stereogram producing device, for the following reason. That is, since it has been confirmed from experiment that the plane of polarization rotates by 180 degrees when the half-wave plate 11 is rotated 90 degrees, the optimum plane of polarization can be detected by rotating the half-wave plate 11 within a range of + and −45 degrees about the origin. Therefore, in the following description, it is assumed that the half-wave plate 11 is set at −45 degrees.

Then, in the holographic stereogram producing device, at step S3, the above-described recording medium feed mechanism 44 is made operable to hold the hologram recording medium 3 under the control of the control computer 22, and then at step S4, the hologram recording medium 3 is driven to travel a predetermined distance, for example, 1 mm, by the recording medium feed mechanism 44 on the basis of a driving signal C3 supplied from the control computer 22, in order to find the leading end.

Subsequently, at step S5, the holographic stereogram producing device waits until the lapse of an oscillation latency time T' that is enough to restrain oscillation of the half-wave plate 11 due to its rotation and oscillation of the hologram recording medium 3 due to its traveling. Then, for example, a totally white image is displayed on the transmission-type liquid crystal display unit 40 as an element hologram image based on the element hologram image data D5 from the control computer 22.

In the holographic stereogram producing device, at step S6, the above-described shutter mechanism 32 is opened and closed once to exposure-record the element hologram on the basis of a control signal C2 supplied from the control computer 22.

Then, at step S7, the holographic stereogram producing device judges whether exposure-recording has been carried out N times or not, that is, whether or not N element holograms have been exposure-recorded on the basis of the rotation angle of −45 degrees of the half-wave plate 11 set at step S2.

If exposure-recording has not been carried out N times, the holographic stereogram producing device shifts to the processing of step S8, and the hologram recording medium 3 is driven to travel a predetermined pitch length, for example, 0.2 mm, by the recording medium feed mechanism 44 on the basis of the driving signal C3 supplied from the control computer 22.

Then, at step S9, the holographic stereogram producing device waits until the lapse of an oscillation latency time that is enough to restrain oscillation of the hologram recording medium 3 due to its traveling, and then repeats the processing of step S6 and the subsequent steps.

As exposure-recording has been thus carried out N times, that is, when it is judged at step S7 that exposure-recording of N element holograms has been completed, the holographic stereogram producing device shifts to the processing of step S10. The number of times "N" of exposure-recording is a value that is set so that the difference between the brightness of the N element holograms exposure-recorded under the condition of a certain identical angle of the half-wave plate 11 and the brightness of the N element holograms exposure-recorded under the condition of another identical angle can be detected by image processing, which will be described later, and visual recognition.

Then, at step S10, the holographic stereogram producing device judges whether or not the half-wave plate 11 has been rotated Q times.

In the holographic stereogram producing device, if the half-wave plate 11 has not been rotated Q times, the half-wave plate 11 is rotated by a predetermined minute pitch angle +P degrees on the basis of the control signal C4 outputted from the control computer 22. As described above, it suffices to rotate the half-wave plate 11 by 90 degrees in total. Therefore, if the predetermined pitch angle +P degrees is 1 degree, the number of times Q judged at step S10 is 90. That is, the number of times Q is expressed by "90/P" using the predetermined pitch angle +P degrees.

In the holographic stereogram producing device, at step S12, the hologram recording medium 3 is driven to travel predetermined pitch length, for example, 0.2 mm, by the recording medium feed mechanism 44 on the basis of the driving signal C3 supplied from the control computer 22. At step S13, the holographic stereogram producing device waits until the lapse of the oscillation latency time T' that is enough to restrain oscillation of the half-wave plate 11 due to its rotation and oscillation of the hologram recording medium 3 due to its traveling, and then repeats the processing of step S6 and the subsequent steps.

Such processing is repeated, and if the result of judgment at step S10 shows that the half-wave plate 11 has been rotated Q times, that is, if exposure-recording of N element holograms has been carried out Q times and the rotation angle of the half-wave plate 11 has reached +45 degrees, which is an angle after rotation of +90 degrees from −45 degrees, the holographic stereogram producing device shifts to the processing of step S14.

In the holographic stereogram producing device, at step S14, the hologram recording medium 3 is driven to travel a predetermined distance on the basis of the driving signal C3 supplied from the control computer 22. At step S15, the hologram recording medium 3 held by the recording medium feed mechanism 44 is released. Thus, the series of processing ends.

In the holographic stereogram producing device, after holographic stereogram images made up of N×Q element holograms are thus exposure-recorded, the above-described fixing processing is carried out to fix the exposure-recorded holographic stereogram images on the hologram recording medium 3. In the holographic stereogram producing device, the hologram recording medium 3 on which the fixing processing has been performed is sequentially cut to a predetermined size and ejected outward as a single holographic stereogram.

Figure 14:
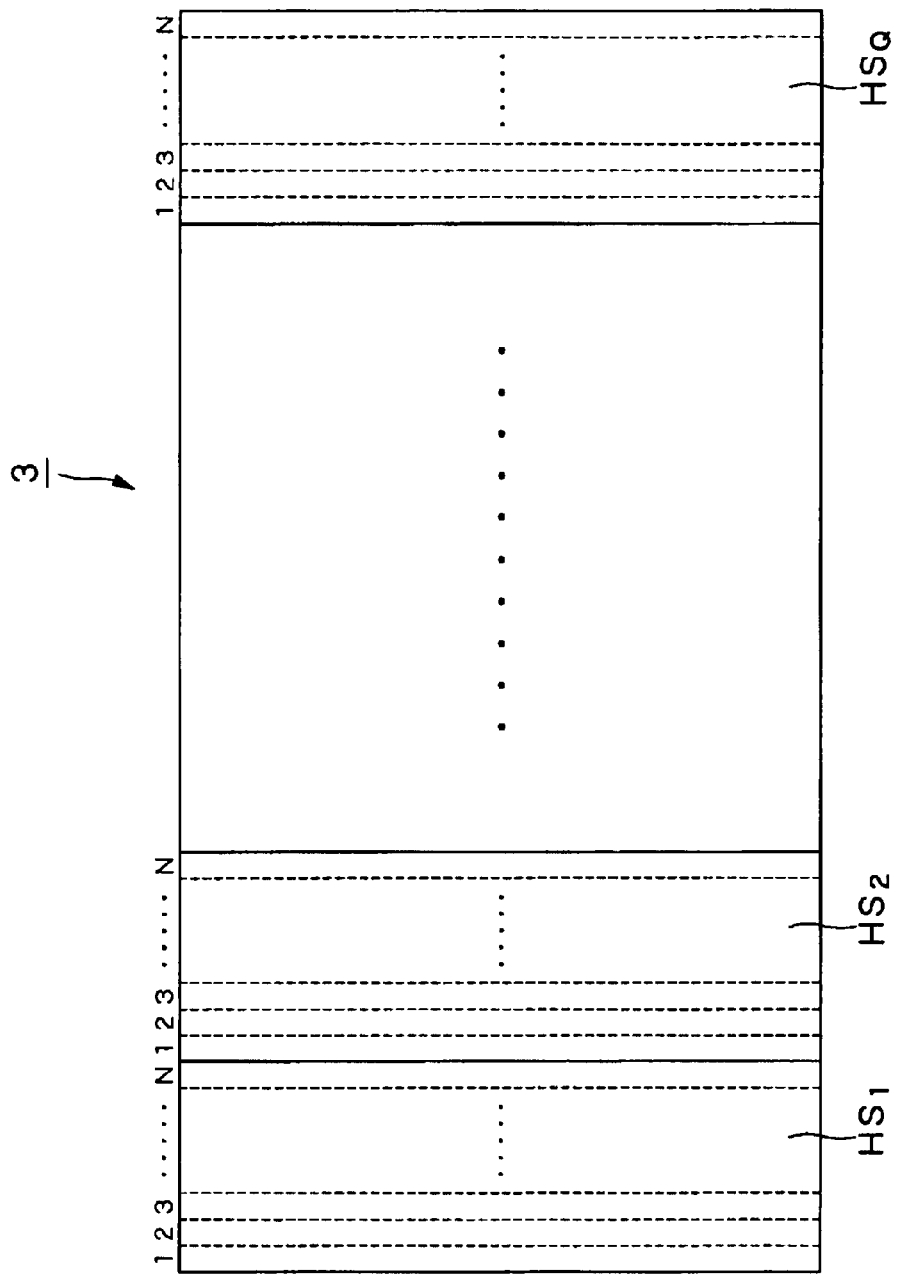
FIG. 14 is a front view of a holographic stereogram produced by conditioning exposure-recording.

The holographic stereogram produced by such conditioning exposure-recording includes sequentially exposure-recorded Q holographic stereogram images $HS_1$, $HS_2$, ..., $HS_Q$, as shown in FIG. 14. Specifically, the holographic stereogram includes the holographic stereogram image $HS_1$ having a lateral width of N×0.2 mm made up of N element holograms exposure-recorded in the state where the half-wave plate 11 is at the rotation angle of −45 degrees set at step S2, the holographic stereogram image $HS_2$ having a lateral width of N×0.2 mm made up of N element holograms exposure-recorded in the state where the half-wave plate 11 is at the rotation angle of (−45+P) degrees set at step S11 before the second exposure-recording, ..., the holographic stereogram image $HS_Q$ having a lateral width of N×0.2 mm made up of N element holograms exposure-recorded in the state where the half-wave plate 11 is at the rotation angle of (−45+P×Q) degrees=(−45+P×90/P) degrees=+45 degrees, set at step S11 before the Qth exposure-recording, with these holographic stereogram images $HS_1$, $HS_2$, ..., $HS_Q$ being sequentially exposure-recorded. These holographic stereogram images $HS_1$, $HS_2$, ..., $HS_Q$ are plain and have different brightness when reproduced.

The holographic stereogram producing device reproduces such a holographic stereogram, then performs image processing using, for example, a photodetector or the like, not shown, and compares the luminance information of the holographic stereogram images $HS_1$, $HS_2$, ..., $HS_Q$, thus finding the rotation angle of the half-wave plate 11 at which exposure-recording was carried out with the highest coherence between object light and reference light. Then, the holographic stereogram producing device sets the half-wave plate 11 at the rotation angle thus found, and produces a holographic stereogram of an arbitrary image.

In the holographic stereogram producing device, by carrying out the above-described conditioning exposure-recording for each exposure-recording of at least one or more holographic stereogram images, for example, approximately 100 holographic stereogram images, the condition which realizes the optimum direction of polarization of the reference light L3 with respect to the direction of orientation of the hologram recording medium 3 can be detected without peeling off the cover film 6 of the hologram recording medium 3 and without separately providing a polarizing plate and a photodetector in the optical system, and therefore a holographic stereogram based on reproduction of bright holographic stereogram images can be produced.

In the holographic stereogram producing device according to the present invention, conditioning exposure-recording may be carried out with no image displayed, instead of displaying a totally white image on the transmission-type liquid crystal display unit 40 as an element hologram image based on the element hologram image data D5. Specifically, in the holographic stereogram producing device, when carrying out conditioning exposure-recording, it is desired to obtain holographic stereogram images based on plain images having no substantial contents in order to simplify the comparison of brightness between the holographic stereogram images $HS_1$, $HS_2$, ..., $HS_Q$ corresponding to the rotation angles of the half-wave plate 11. Any technique that realizes this is applicable.

In the holographic stereogram producing device according to the present invention, instead of performing image processing when finding the rotation angle of the half-wave plate 11, the brightness of the holographic stereogram images $HS_1$, $HS_2$, ..., $HS_Q$ may be compared and confirmed visually if the brightness can be detected.

The technique for detecting the polarization state accompanying such exposure-recording can also be applied to inverse correction of the plane of polarization of the reference light by rotating the hologram recording medium 3, as described above. In this case, the holographic stereogram producing device has a structure similar to that of the holographic stereogram producing device 20A shown in FIGS. 11 and 12 from which the polarizing plate 52, the photodetector 53 and the feedback control unit 23A have been eliminated. In this holographic stereogram producing device, the polarization state that achieves the highest coherence between reference light and object light can be detected by controlling the rotation angle of the hologram recording medium 3 instead of controlling the rotation angle of the half-wave plate 11 in the series of processing shown in FIG. 13.

In this case, it should be noted that, theoretically, the hologram recording medium 3 must be rotated by 180 degrees in total in the holographic stereogram producing device, not 90 degrees in total as in the rotation of the half-wave plate 11. Actually, however, it is known that all the polarization states can be found by rotating the hologram recording medium 3 within an angular range of the polarization axis of the hologram recording medium 3 in the holographic stereogram producing device. Although depending on the specifications of the hologram recording medium 3, it suffices to rotate the half-wave plate 11, for example, within a range of + and −20 degrees about a predetermined origin.

In the holographic stereogram producing device according to the present invention, by rotating the hologram recording medium 3 when carrying out conditioning exposure-recording, a plurality of holographic stereogram images having different directions within the major surface of the hologram recording medium 3 are exposure-recorded. Therefore, in the holographic stereogram producing device, the direction of intermittent feeding of the hologram recording medium 3 by the recording medium feed mechanism 44 must be properly corrected every time the hologram recording medium 3 is rotated when carrying out conditioning exposure-recording, so that the exposure-recorded holographic stereogram images do not overlap each other.

As described above, in the holographic stereogram producing device, inverse correction is carried out by inclining the plane of polarization of light incident on the hologram recording medium in advance by using the half-wave plate or by rotating the hologram recording medium itself. Thus, reduction in coherence between object light and reference light due to double refraction can be avoided and instability in brightness of holographic stereogram images can be eliminated. Therefore, the holographic stereogram producing device can produce a holographic stereogram based on reproduction of bright holographic stereogram images.

It should be noted that the present invention is not limited to the above-described example. For example, while a mica wave plate or the like is used as the half-wave plate in the above-described example, it is effective to use a Fresnel-Rom wave plate when producing a color holographic stereogram. Specifically, since laser beams having a plurality of wavelengths are required when producing a color holographic stereogram, the holographic stereogram producing device can produce a stable color holographic stereogram by using a Fresnel-Rom wave plate, which is less wavelength-dependent.

In the above-described example, at least one of the base film and the cover film of the hologram recording medium is peeled off to carry out exposure-recording. However, according to the present invention, if a hologram recording medium using one film having double refraction and the other film having no double refraction is used, exposure-recording may be carried out without peeling off any of these films.

Moreover, in the above-described example, the holographic stereogram producing devices to which the two types of inverse correction systems are separately applied are described. However, according to the present invention, these two types of inverse correction systems can be combined and therefore a more stable holographic stereogram can be produced. This also applies to the case of using the technique of detecting the optimum polarization state by carrying out conditioning exposure-recording.

Furthermore, the present invention can also be applied to a hologram instead of a holographic stereogram. Specifically, while a holographic stereogram is produced by the holographic stereogram producing device in the above-described embodiment, the present invention can also be easily applied to the case of producing a hologram. In other words, the present invention can be applied to any exposure-recording of an image based on incidence of light on the hologram recording medium made of a film having double refraction.

Figure 15:
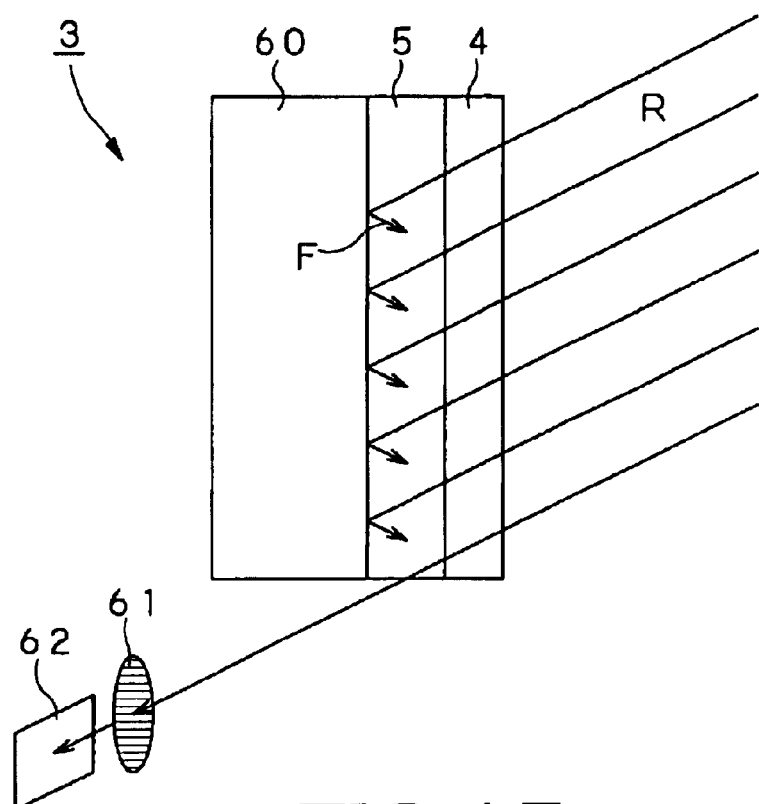
FIG. 15 is a view for explaining the structure of an inverse correction system in a duplicating device.

As an exemplary application of this, FIG. 15 shows application of the present invention to the case of producing a duplicate of a hologram by a technique called contact copy. In this technique, a master 60 as an original having holographic stereogram images or hologram images exposure-recorded thereon and the hologram recording medium 3 are brought in contact with each other, and the reference light R is cast from the side of the hologram recording medium 3. Reflected light F of the reference light R reflected by the master 60 simulates the object light and is caused to interfere with the reference light R, thus recording the holographic stereogram images or hologram images exposure-recorded on the master 60 to the hologram recording medium 3. In this case, in a duplicating device for producing the duplicate, one major surface of the hologram recording medium 3 from which the cover film 6 has been peeled off is brought in contact with a major surface of the master 60, and the reference light R is caused to be incident on the hologram recording medium 3 with its other major surface covered with the base film 4, thus carrying out exposure-recording.

The duplicating device uses the above-described inverse correction system, in which the plane of polarization of the linearly polarized reference light R is rotated by the half-wave plate, not shown here, and the reference light R with its plane of polarization rotated by a predetermined angle is made incident on the hologram recording medium 3. Moreover, in the duplicating device, the reference light R transmitted and double-refracted through a partial area of the hologram recording medium 3 is led to a polarizing plate 61 and the intensity of the reference light R transmitted through the polarizing plate 61 is detected by a photodetector 62. Then, in the duplicating device, the rotation angle of the half-wave plate is decided so that the intensity of the reference light R detected by the photodetector 62 reaches the minimum or maximum. In the duplicating device, it suffices to detect only the polarization state of the reference light R using the polarizing plate 61 and the photodetector 62. This is because the polarization state of the reference light R before reflection by the master 60 is substantially preserved after the reflection and therefore the polarization state of the reference light R and the polarization state of the reflected light F are substantially the same.

The duplicating device can also obtain similar effects by using an inverse correction system in which the hologram recording medium 3 is rotated by a recording medium rotation mechanism, not shown here, instead of using the half-wave plate.

By thus carrying out inverse correction so that the highest coherence is obtained between the reference light R and the reflected light F and reducing the influence of double refraction of the hologram recording medium 3, the duplicating device can produce a duplicate based on reproduction of bright holographic stereogram images or hologram images.

Figure 16:
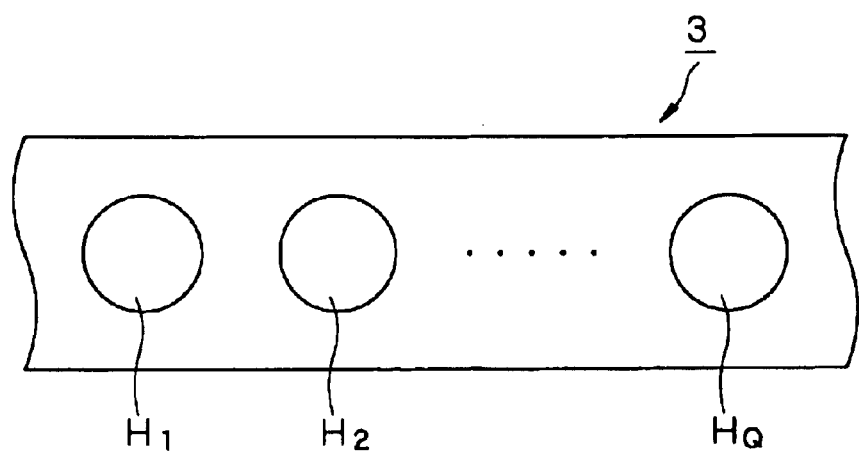
FIG. 16 is a front view of a hologram produced by conditional exposure-recording.
Figure 17:
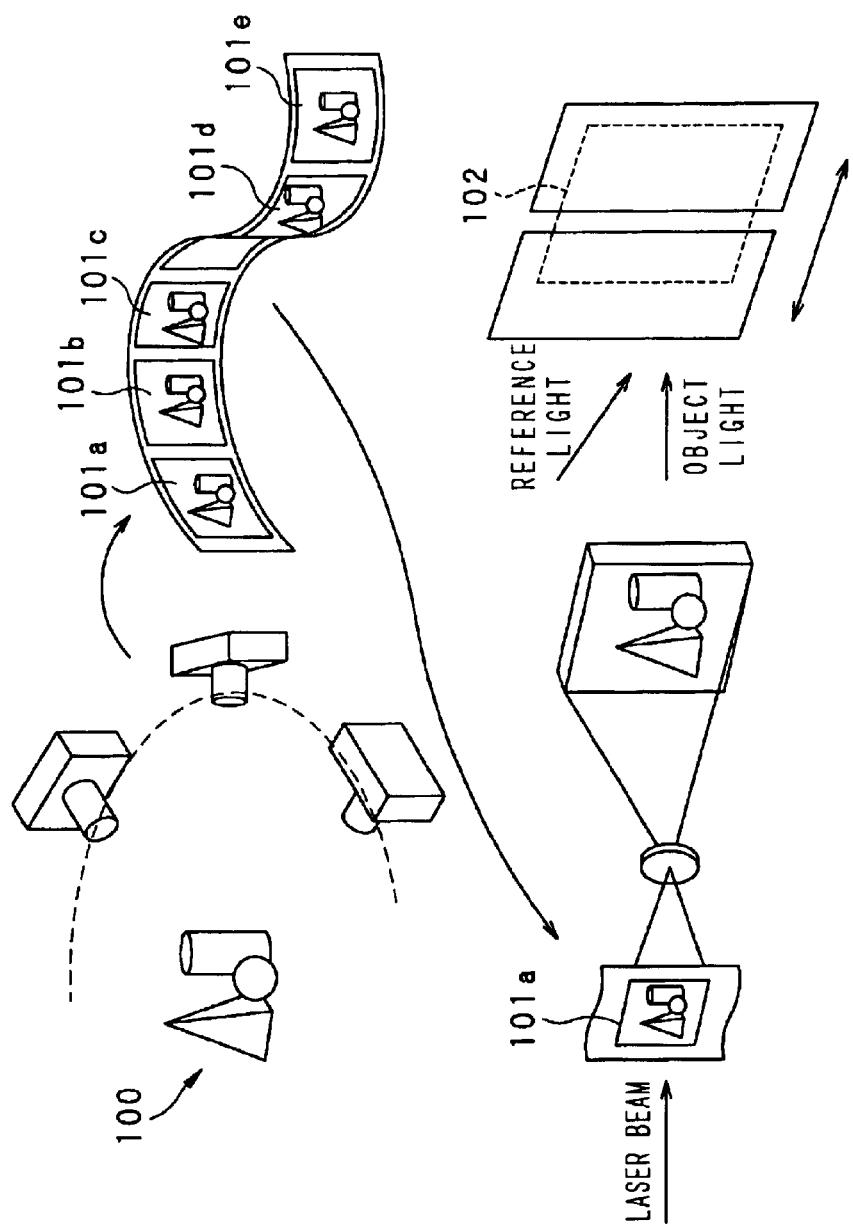
FIG. 17 is a view for explaining a typical holographic stereogram producing method.
Figure 18:
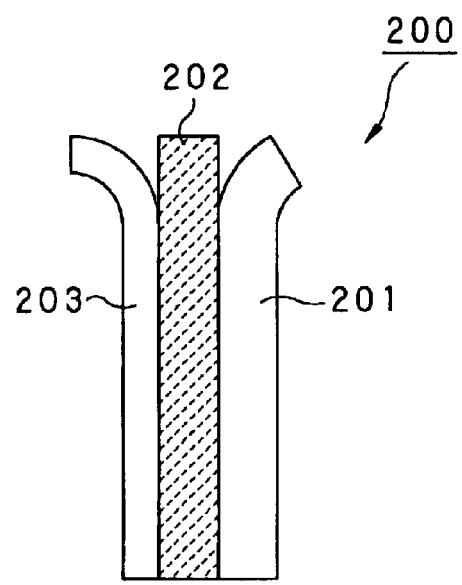
FIG. 18 is a cross-sectional view of essential parts for explaining a typical hologram recording medium.
Figure 19:
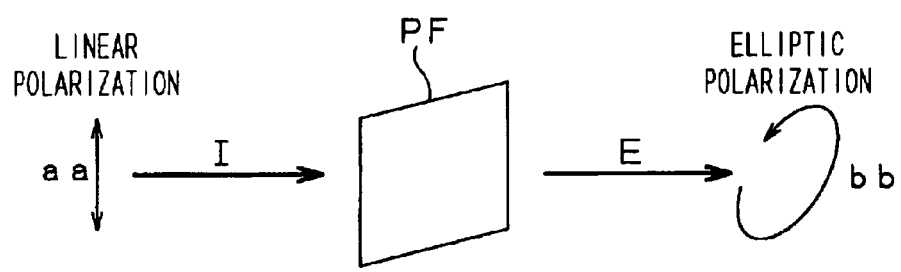
FIG. 19 is a conceptual view for explaining double refraction caused by a PET film.
Figure 20:
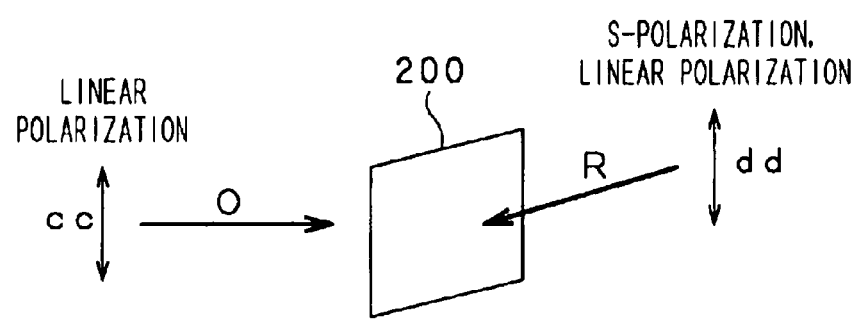
FIG. 20 is a conceptual view for explaining the polarization states of object light and reference light incident on a typical hologram recording medium.

In the case where the present invention is applied to a hologram instead of a holographic stereogram and the technique of detecting the optimum polarization state by carrying out conditioning exposure-recording is used, for example, a mirror and a diffuser may be provided at the position where the above-described transmission-type liquid crystal display unit 40 would be installed when producing a holographic stereogram, that is, at the position where an object to be exposure-recorded as hologram images is placed. That is, in this case, as shown in FIG. 16, Q hologram images $H_1, H_2, \ldots, H_Q$ made up of circular or similar regions having a predetermined area, instead of the above-described holographic stereogram images made up of N element holograms, are sequentially exposure-recorded while changing the rotation angle of the half-wave plate 11 or the hologram recording medium 3, and their brightness is compared. Thus, the optimum rotation angle of the half-wave plate 11 or the hologram recording medium 3 can be found.

As a matter of course, various changes and modifications can be effected without departing from the scope of the present invention.

Industrial Applicability

According to the present invention, reduction in coherence between object light and reference light due to transmission of the object light and the reference light through a hologram recording medium having double refraction is avoided to lead out the optimum coherence for producing a holographic stereogram or a hologram, and instability in brightness of holographic stereogram images or hologram images is eliminated, thus enabling production of a holographic stereogram or a hologram based on reproduction of bright holographic stereogram images or hologram images.

What is claimed is:

1. An image exposure-recording device for exposure-recording holographic stereogram images or hologram images to a hologram recording medium, the device comprising:

exposure-recording means for casting a laser beam as object light and reference light to said hologram recording medium and thus exposure-recording said holographic stereogram images or said hologram images;

polarization state detection means for detecting the polarization state of said laser beam transmitted through said hologram recording medium; and polarization state varying means for changing the polarization state of said laser beam caused to be incident on said hologram recording medium on the basis of the result of the detection by said polarization state detection means so that the highest coherence between the object light and the reference light is obtained on a recording layer in said hologram recording medium.

2. The image exposure-recording device as claimed in claim 1, wherein said polarization state varying means changes the polarization state by rotating the plane of polarization of said laser beam.

3. The image exposure-recording device as claimed in claim 2, wherein said polarization state varying means has a half-wave plate for rotating the plane of polarization of said laser beam, and rotates said half-wave plate on the basis of the result of the detection by said polarization state detection means to control the plane of polarization of said laser beam.

4. The image exposure-recording device as claimed in claim 1, wherein said polarization state detection means has a polarizing plate for transmitting only a component having a predetermined plane of polarization, of said laser beam transmitted through said hologram recording medium, and a photodetector for detecting the intensity of said laser beam transmitted through said polarizing plate.

5. The image exposure-recording device as claimed in claim 1, wherein said exposure-recording means casts said laser beam on said hologram recording medium in the state where at least one of supporting materials covering both major surfaces of said hologram recording medium has been peeled off.

6. The image exposure-recording device as claimed in claim 1, wherein said exposure-recording means casts said object light and said reference light on said hologram recording medium in the state where a supporting material covering a major surface to be irradiated with the object light, of supporting materials covering both major surfaces of said hologram recording medium, has been peeled off;

wherein said polarization state detection means detects the polarization state of said reference light transmitted through said hologram recording medium; and wherein said polarization state varying means changes the polarization state of the reference light caused to be incident on said hologram recording medium, on the basis of the result of the detection by said polarization state detection means.

7. The image exposure-recording device as claimed in claim 1, wherein said polarization state varying means changes the polarization state of said laser beam in the state where said object light and said reference light are not cast on said hologram recording medium.

8. The image exposure-recording device as claimed in claim 7, wherein said polarization state varying means changes the polarization state of said laser beam for each exposure-recording of one or plural said holographic stereogram images or said hologram images.

9. The image exposure-recording device as claimed in claim 7, wherein said polarization state detection means detects the polarization state of said laser beam during exposure-recording of a predetermined number of said holographic stereogram images or said hologram images, and said polarization state varying means changes the polarization state of said laser beam on the basis of statistical information of the result of the detection by said polarization state detection means.

10. The image exposure-recording device as claimed in claim 7, wherein said polarization state detection means detects the polarization state of said laser beam during exposure-recording of at least one or more said holographic stereogram images or said hologram images, and said polarization state varying means changes the polarization state of said laser beam when the result of the detection by said polarization state detection means indicates deviation from a predetermined polarization state.

11. An image exposure-recording method for exposure-recording holographic stereogram images or hologram images to a hologram recording medium, the method comprising:

a polarization state detection step of, when casting a laser beam as object light and reference light to said hologram recording medium and thus exposure-recording said holographic stereogram images or said hologram images, detecting the polarization state of said laser beam transmitted through said hologram recording medium; and a polarization state varying step of changing the polarization state of said laser beam caused to be incident on said hologram recording medium on the basis of the result of the detection at said polarization state detection step so that the highest coherence between the object light and the reference light is obtained on a recording layer in said hologram recording medium.

12. The image exposure-recording method as claimed in claim 11, wherein at said polarization state varying step, the polarization state is changed by rotating the plane of polarization of said laser beam.

13. The image exposure-recording method as claimed in claim 12, wherein at said polarization state varying step, a half-wave plate is rotated on the basis of the result of the detection at said polarization state detection step and the plane of polarization of said laser beam is thus controlled by the half-wave plate.

14. The image exposure-recording method as claimed in claim 11, wherein at said polarization state detection step, only a component having a predetermined plane of polarization, of said laser beam transmitted through said hologram recording medium, is transmitted by a polarizing plate, and the intensity of said laser beam transmitted through said polarizing plate is detected by a photodetector.

15. The image exposure-recording method as claimed in claim 11, wherein said laser beam is cast on said hologram recording medium in the state where at least one of supporting materials covering both major surfaces of said hologram recording medium has been peeled off.

16. The image exposure-recording method as claimed in claim 11, wherein said object light and said reference light are cast on said hologram recording medium in the state where a supporting material covering a major surface to be irradiated with the object light, of supporting materials covering both major surfaces of said hologram recording medium, has been peeled off;

wherein at said polarization state detection step, the polarization state of said reference light transmitted through said hologram recording medium is detected; and wherein at said polarization state varying step, the polarization state of the reference light caused to be incident on said hologram recording medium is changed on the basis of the result of the detection at said polarization state detection step.

17. The image exposure-recording method as claimed in claim 11, wherein at said polarization state varying step, the polarization state of said laser beam is changed in the state where said object light and said reference light are not cast on said hologram recording medium.

18. The image exposure-recording method as claimed in claim 17, wherein at said polarization state varying step, the polarization state of said laser beam is changed for each exposure-recording of one or plural said holographic stereogram images or said hologram images.

19. The image exposure-recording method as claimed in claim 17, wherein at said polarization state detection step, the polarization state of said laser beam is detected during exposure-recording of a predetermined number of said holographic stereogram images or said hologram images, and at said polarization state varying step, the polarization state of said laser beam is changed on the basis of statistical information of the result of the detection at said polarization state detection step.

20. The image exposure-recording method as claimed in claim 17, wherein at said polarization state detection step, the polarization state of said laser beam is detected during exposure-recording of at least one or more said holographic stereogram images or said hologram images, and at said polarization state varying step, the polarization state of said laser beam is changed when the result of the detection at said polarization state detection step indicates deviation from a predetermined polarization state.

21. An image exposure-recording device for exposure-recording holographic stereogram images or hologram images to a hologram recording medium, the device comprising:

exposure-recording means for casting a laser beam as object light and reference light to said hologram recording medium and thus exposure-recording said holographic stereogram images or said hologram images;

polarization state detection means for detecting the polarization state of said laser beam transmitted through said hologram recording medium; and recording medium rotation means for rotating said hologram recording medium on the basis of the result of the detection in an inner direction of a major surface of said hologram recording medium by said polarization state detection means so that the highest coherence between the object light and the reference light is obtained on a recording layer in said hologram recording medium.

22. The image exposure-recording device as claimed in claim 21, wherein said polarization state detection means has a polarizing plate for transmitting only a component having a predetermined plane of polarization, of said laser beam transmitted through said hologram recording medium, and a photodetector for detecting the intensity of said laser beam transmitted through said polarizing plate.

23. The image exposure-recording device as claimed in claim 21, wherein said exposure-recording means casts said laser beam on said hologram recording medium in the state where at least one of supporting materials covering both major surfaces of said hologram recording medium has been peeled off.

24. The image exposure-recording device as claimed in claim 21, wherein said exposure-recording means casts said object light and said reference light on said hologram recording medium in the state where a supporting material covering a major surface to be irradiated with the object light, of supporting materials covering both major surfaces of said hologram recording medium, has been peeled off; and wherein said polarization state detection means detects the polarization state of said reference light transmitted through said hologram recording medium.

25. The image exposure-recording device as claimed in claim 21, wherein said recording medium rotation means rotates said hologram recording medium in the state where said object light and said reference light are not cast on said hologram recording medium.

26. The image exposure-recording device as claimed in claim 25, wherein said recording medium rotation means rotates said hologram recording medium for each exposure-recording of one or plural said holographic stereogram images or said hologram images.

27. The image exposure-recording device as claimed in claim 25, wherein said polarization state detection means detects the polarization state of said laser beam during exposure-recording of a predetermined number of said holographic stereogram images or said hologram images, and said recording medium rotation means rotates said hologram recording medium on the basis of statistical information of the result of the detection by said polarization state detection means.

28. An image exposure-recording method for exposure-recording holographic stereogram images or hologram images to a hologram recording medium, the method comprising:

a polarization state detection step of, when casting a laser beam as object light and reference light on said hologram recording medium and thus exposure-recording said holographic stereogram images or said hologram images, detecting the polarization state of said laser beam transmitted through said hologram recording medium; and a recording medium rotation step of rotating said hologram recording medium on the basis of the result of the detection at said polarization state detection step so that the highest coherence between the object light and the reference light is obtained on a recording layer in said hologram recording medium.

29. The image exposure-recording method as claimed in claim 28, wherein at said recording medium rotation step, said hologram recording medium is rotated in an inner direction of a major surface of said hologram recording medium.

30. The image exposure-recording method as claimed in claim 28, wherein at said polarization state detection step, only a component having a predetermined plane of polarization, of said laser beam transmitted through said hologram recording medium, is transmitted by an optical element, and the intensity of said laser beam transmitted through said optical element is detected by intensity detection means.

31. The image exposure-recording method as claimed in claim 30, wherein a polarizing plate is used as said optical element and a photodetector is used as said intensity detection means.

32. The image exposure-recording method as claimed in claim 28, wherein said laser beam is cast on said hologram recording medium in the state where at least one of supporting materials covering both major surfaces of said hologram recording medium has been peeled off.

33. The image exposure-recording method as claimed in claim 28, wherein at said polarization state detection step, the polarization state of said reference light transmitted through said hologram recording medium is detected.

34. The image exposure-recording method as claimed in claim 28, wherein said object light and said reference light are cast on said hologram recording medium in the state where a supporting material covering a major surface to be irradiated with the object light, of supporting materials covering both major surfaces of said hologram recording medium, has been peeled off.

35. The image exposure-recording method as claimed in claim 28, wherein said object light and said reference light in linear polarization states are cast on said hologram recording medium.

36. The image exposure-recording method as claimed in claim 28, wherein at said recording medium rotation step, said hologram recording medium is rotated in the state where said object light and said reference light are not cast on said hologram recording medium.

37. The image exposure-recording method as claimed in claim 36, wherein at said recording medium rotation step, said hologram recording medium is rotated for each exposure-recording of one or plural said holographic stereogram images or said hologram images.

38. The image exposure-recording method as claimed in claim 36, wherein at said polarization state detection step, the polarization state of said laser beam is detected during exposure-recording of a predetermined number of said holographic stereogram images or said hologram images, and at said recording medium rotation step, said hologram recording medium is rotated on the basis of statistical information of the result of the detection at said polarization state detection step.

39. The image exposure-recording method as claimed in claim 36, wherein at said polarization state detection step, the polarization state of said laser beam is detected during exposure-recording of at least one or more said holographic stereogram images or said hologram images, and at said recording medium rotation step, said hologram recording medium is rotated when the result of the detection at said polarization state detection step indicates deviation from a predetermined polarization state.

40. The image exposure-recording method as claimed in claim 36, wherein at said recording medium rotation step, said hologram recording medium is rotated for each exposure-recording of element holograms constituting said holographic stereogram images.

41. An image exposure-recording device for exposure-recording holographic stereogram images or hologram images to a hologram recording medium, the device comprising:
   exposure-recording means for casting a laser beam as object light and reference light on said hologram recording medium and thus exposure-recording said holographic stereogram images or said hologram images; and
   polarization state varying means for changing the polarization state of said laser beam caused to be incident on said hologram recording medium,
   wherein said exposure-recording means exposure-records a plurality of conditioning holographic stereogram images or hologram images for each change in polarization state by said polarization state varying means, as conditioning exposure-recording for deciding a polarization state of said laser beam such that the highest coherence between the object light and the reference light is obtained on a recording layer in said hologram recording medium, for each exposure-recording of at least one or more said holographic stereogram images or said hologram images, and
   said polarization state varying means changes the polarization state of said laser beam so as to obtain the polarization state of said laser beam such that the highest coherence between said object light and said reference light is obtained, detected on the basis of a plurality of said conditioning holographic stereogram images or said conditioning hologram images.

42. An image exposure-recording device for exposure-recording holographic stereogram images or hologram images to a hologram recording medium, the device comprising:
   exposure-recording means for casting a laser beam as object light and reference light on said hologram recording medium and thus exposure-recording said holographic stereogram images or said hologram images; and
   recording medium rotation means for rotating said hologram recording medium,
   wherein said exposure-recording means exposure-records a plurality of conditioning holographic stereogram images or hologram images for each rotation of said hologram recording medium by said recording medium rotation means, as conditioning exposure-recording for deciding a polarization state of said laser beam such that the highest coherence between the object light and the reference light is obtained on a recording layer in said hologram recording medium, for each exposure-recording of at least one or more said holographic stereogram images or said hologram images, and
   said recording medium rotation means rotates said hologram recording medium so as to obtain the polarization state of said laser beam such that the highest coherence between said object light and said reference light is obtained, detected on the basis of a plurality of said conditioning holographic stereogram images or said conditioning hologram images.

* * * * *